US012059918B1

(12) United States Patent
Bina

(10) Patent No.: US 12,059,918 B1
(45) Date of Patent: Aug. 13, 2024

(54) ILLUMINATED BOOK DEVICE

(71) Applicant: Booklit LLC, Kings Point, NY (US)

(72) Inventor: David Bina, Kings Point, NY (US)

(73) Assignee: Booklit LLC, Kings Point, NY (US)

( * ) Notice: Subject to any disclaimer, the term of this patent is extended or adjusted under 35 U.S.C. 154(b) by 0 days.

(21) Appl. No.: 18/368,079

(22) Filed: Sep. 14, 2023

Related U.S. Application Data

(60) Provisional application No. 63/466,109, filed on May 12, 2023.

(51) Int. Cl.
*B42D 1/00* (2006.01)
*F21S 9/02* (2006.01)
*F21V 33/00* (2006.01)
*F21W 131/30* (2006.01)

(52) U.S. Cl.
CPC ................ *B42D 1/007* (2013.01); *F21S 9/02* (2013.01); *F21V 33/0048* (2013.01); *F21W 2131/3005* (2013.01)

(58) Field of Classification Search
CPC ................... B42D 1/007; B42D 3/123; F21W 2131/3005; F21V 33/0048; F21V 33/0032; B43L 1/006; B43L 3/002; B42P 2221/02
See application file for complete search history.

(56) References Cited

U.S. PATENT DOCUMENTS 4,083,137 A * 4/1978 Rozmanith .............. G09F 3/18 40/772
4,209,824 A * 6/1980 Kaufman ............. B42D 15/022 40/124.02
4,990,092 A * 2/1991 Cummings ............ G09B 5/062 434/339
5,290,190 A * 3/1994 McClanahan .......... G09B 5/062 434/317
5,639,156 A * 6/1997 Broxson ................. B42F 9/004 362/802
6,164,859 A * 12/2000 Hambright ............... B42D 1/08 281/38
6,405,167 B1 * 6/2002 Cogliano ............... G09B 19/06 434/167
6,591,526 B1 * 7/2003 Garrett ..................... B42D 1/08 40/457
6,637,907 B1 * 10/2003 Levy .................... B42D 15/022 362/802
6,792,243 B2 * 9/2004 Ka-wah ................... G09B 5/00 434/308
2001/0018809 A1 * 9/2001 Heropoulos ............ G09F 13/22 40/544
2007/0201714 A1 * 8/2007 Lee ........................ H04R 7/045 381/124

(Continued)

*Primary Examiner* — Peggy A Neils
*Assistant Examiner* — James M Endo
(74) *Attorney, Agent, or Firm* — Collard & Roe, P.C.; William Collard

(57) ABSTRACT

An electronic page illumination device including at least one binder, at least one battery disposed inside of said at least one binder, and at least one page coupled to said at least one binder. The page includes a bracket, a first translucent sheet, and a second oppositely spaced translucent sheet and at least one light disposed inside of the bracket. A written page or an image is configured to be placed between or over said first translucent sheet and said second translucent sheet and then illuminated by said light which is disposed inside of the bracket.

20 Claims, 27 Drawing Sheets

(56) References Cited

U.S. PATENT DOCUMENTS

| | | | | | |
|---|---|---|---|---|---|
| 2007/0223211 | A1* | 9/2007 | Jeffrey | G09F 23/06 | 362/98 |
| 2007/0258245 | A1* | 11/2007 | Floyd | B42D 3/123 | 362/311.06 |
| 2010/0052306 | A1* | 3/2010 | Teicher | B42D 3/123 | 281/45 |
| 2010/0167258 | A1* | 7/2010 | Ravizza | B42B 5/12 | 434/317 |
| 2010/0187802 | A1* | 7/2010 | Katzman | B42F 5/00 | 281/38 |
| 2011/0134625 | A1* | 6/2011 | Broxson | F21V 33/0048 | 362/183 |
| 2011/0212429 | A1* | 9/2011 | Stone | G09B 5/062 | 434/317 |
| 2011/0233272 | A1* | 9/2011 | Yau | B42D 3/12 | 235/375 |
| 2015/0242185 | A1* | 8/2015 | Stone | G09B 5/06 | 345/174 |
| 2016/0063876 | A1* | 3/2016 | Javidan | G09B 5/06 | 715/201 |
| 2016/0159133 | A1* | 6/2016 | Hudachek | F21V 33/0004 | 281/29 |

* cited by examiner

FIG. 11A
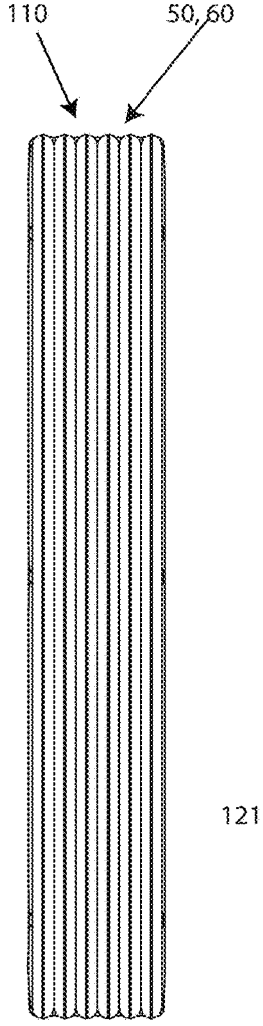
FIG. 11B
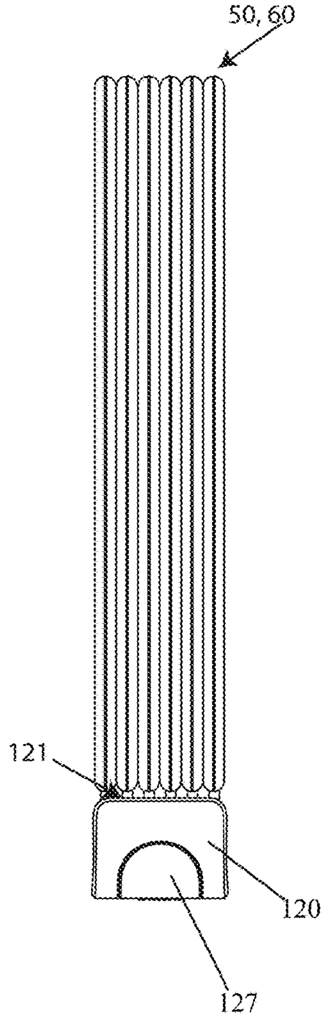
FIG. 11C
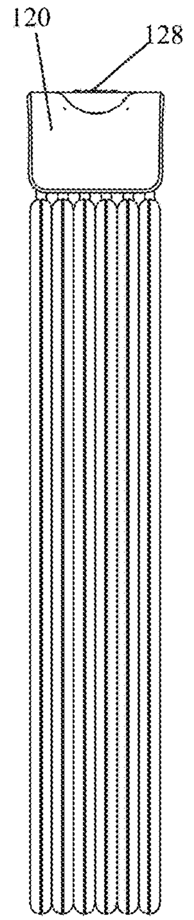
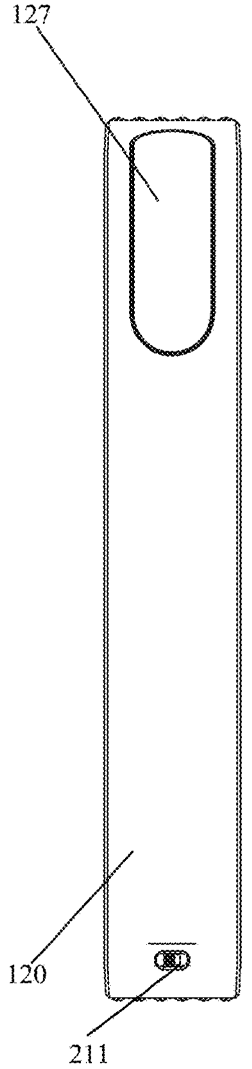
FIG. 11D

FIG. 18A
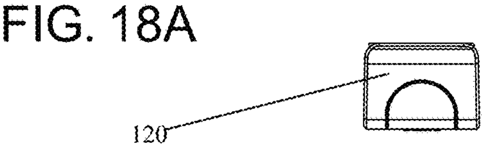
FIG. 18C
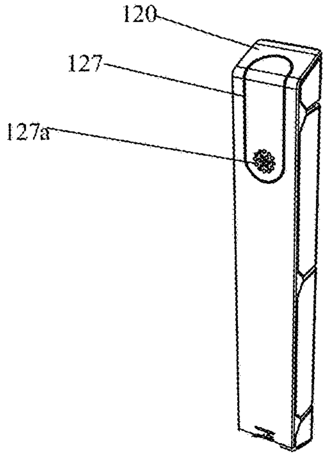
FIG. 18B
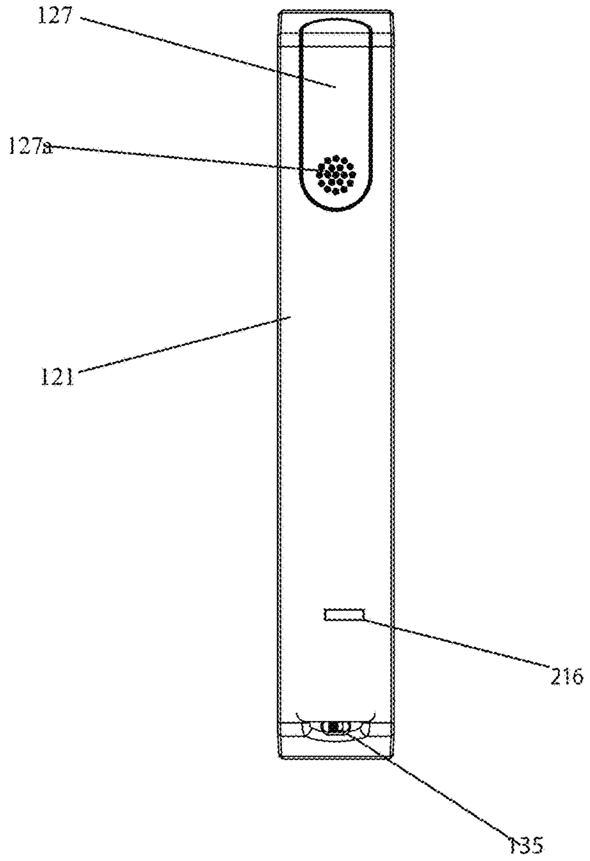
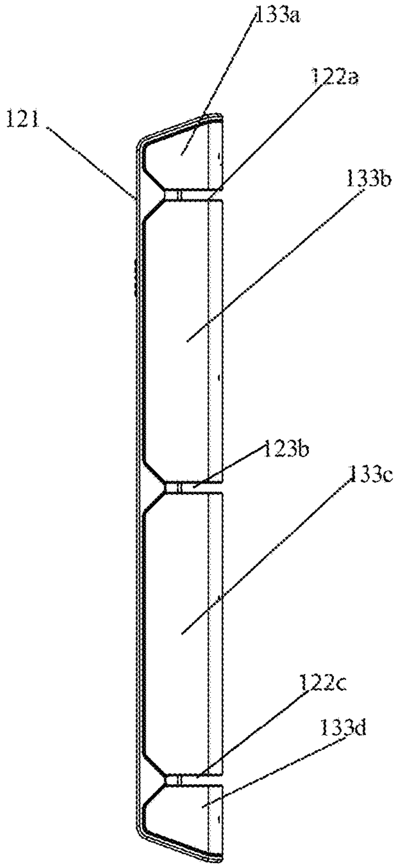
FIG. 18D

ILLUMINATED BOOK DEVICE

CROSS REFERENCE TO RELATED APPLICATIONS

This application is a non-provisional application of U.S. Patent Application Ser. No. 63/466,109 filed on May 12, 2023, the disclosure of which is hereby incorporated herein by reference in its entirety.

BACKGROUND OF THE INVENTION

The invention relates to an illuminated book device which is configured to light pages up that are applied over or inserted into frames in the book. Currently there are books, and there are electronic E-reader books but there are no known book illumination devices wherein individual pages are inserted into separate frames or applied over the frame, and then illuminated from a periphery on the frames. Therefore, there is a need for an illuminated book device to illuminate pages of a book to make the reading experience a pleasurable experience.

SUMMARY

One embodiment relates to an electronic page illumination device comprising at least one binder, at least one battery disposed inside with an alternative of a single or set of rechargeable battery or batteries of the binder, at least one page coupled to at least one binder. The page comprises a bracket, a first translucent sheet, a second oppositely spaced translucent sheet and at least one strip light disposed inside of the bracket. A written page or image(s) is configured to be placed over or between the first translucent sheet and the second translucent sheet and then illuminated by the light which is disposed inside of the bracket. The device can have multiple translucent plexiglass or acrylic sheets or a single sheet which can either serve as a backing (single sheet) for a display sheet such as paper or for a cover (two translucent sheets) for the display sheets.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 11A is a right-side view of the book shown in FIG. 7;

FIG. 11B is a top view of the book shown in FIG. 7;

FIG. 11C is a bottom view of the book shown in FIG. 7;

FIG. 11D is a left side view of the book shown in FIG. 7;

FIG. 18A is a top view of a rectangular binder;

FIG. 18B is a side view of a rectangular binder;

FIG. 18C is a perspective view of a rectangular binder;

FIG. 18D is a side view of the rectangular binder;

DETAILED DESCRIPTION

Figure 1:
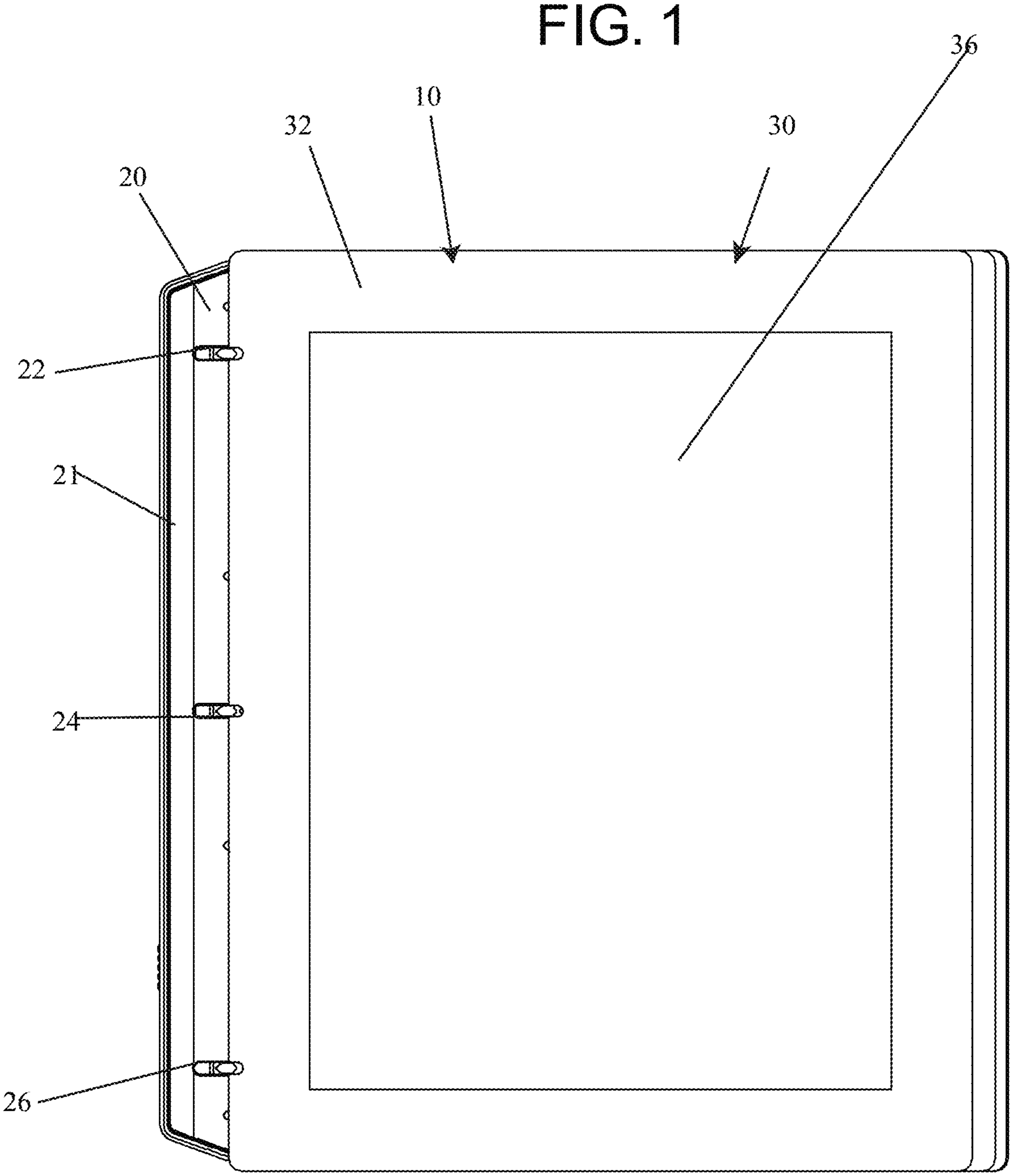
FIG. 1 is a front view of a book.
Figure 2:
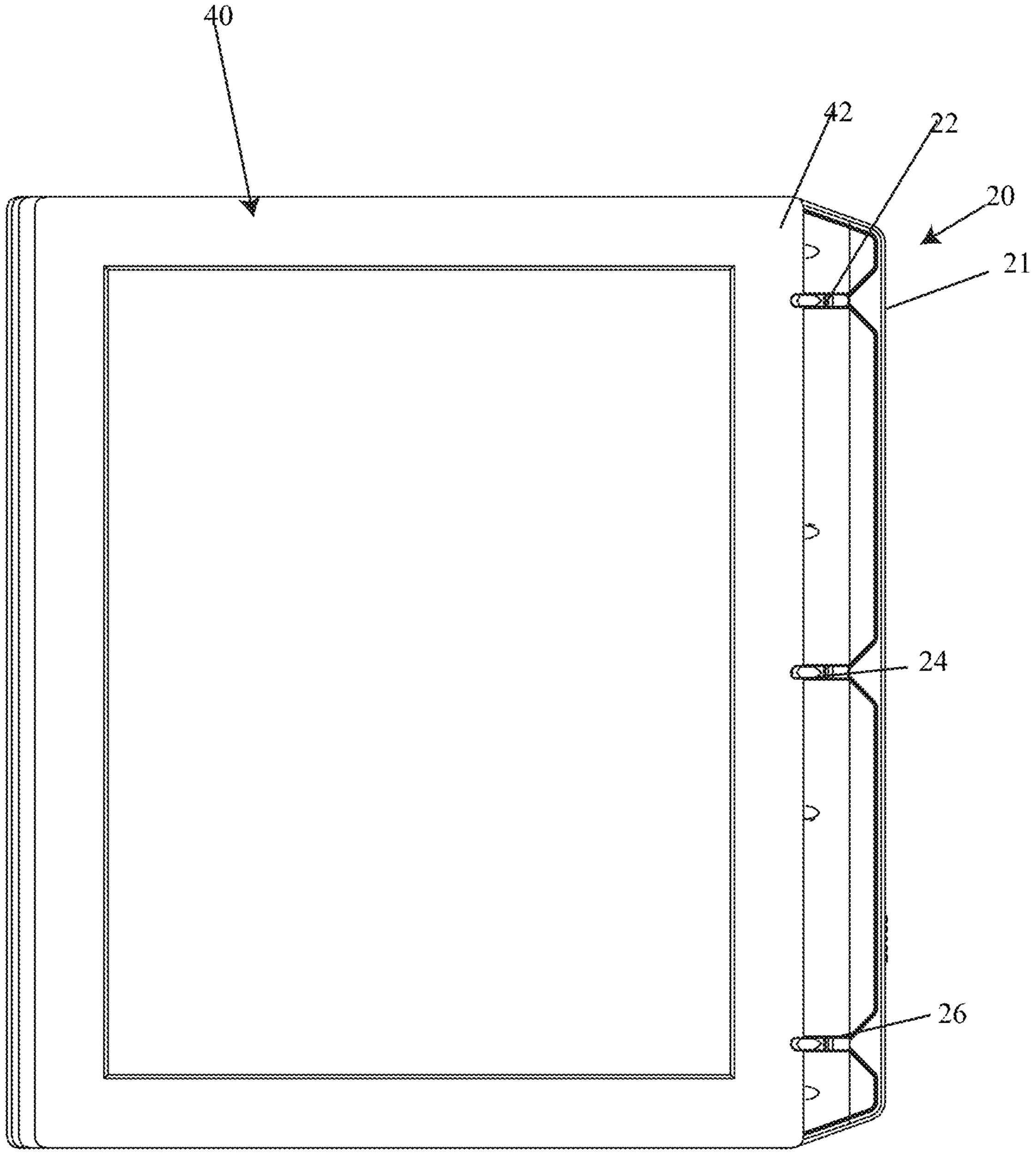
FIG. 2 is a back view of a book.

Referring in detail to the drawings, FIG. 1 is a front view of an electronic book device 10 which has a binder 20 having a plate section 21, and having a plurality of clips 22, 24, and 26. There are a plurality of pages 30 coupled to the binder wherein these pages include an outer frame 32, and a center section or sheet 36. Additional other pages 40 are also shown. FIG. 2 shows the back view of this book wherein the back view has pages 40 with an outer frame 42 coupled to clips 22, 24, and 26. Clips 22, 24, and 26 are selectively openable to allow for the release of pages from the binder. Center clip, 24 has an opening to allow strip light to travel from each page into the binder.

Figure 3:
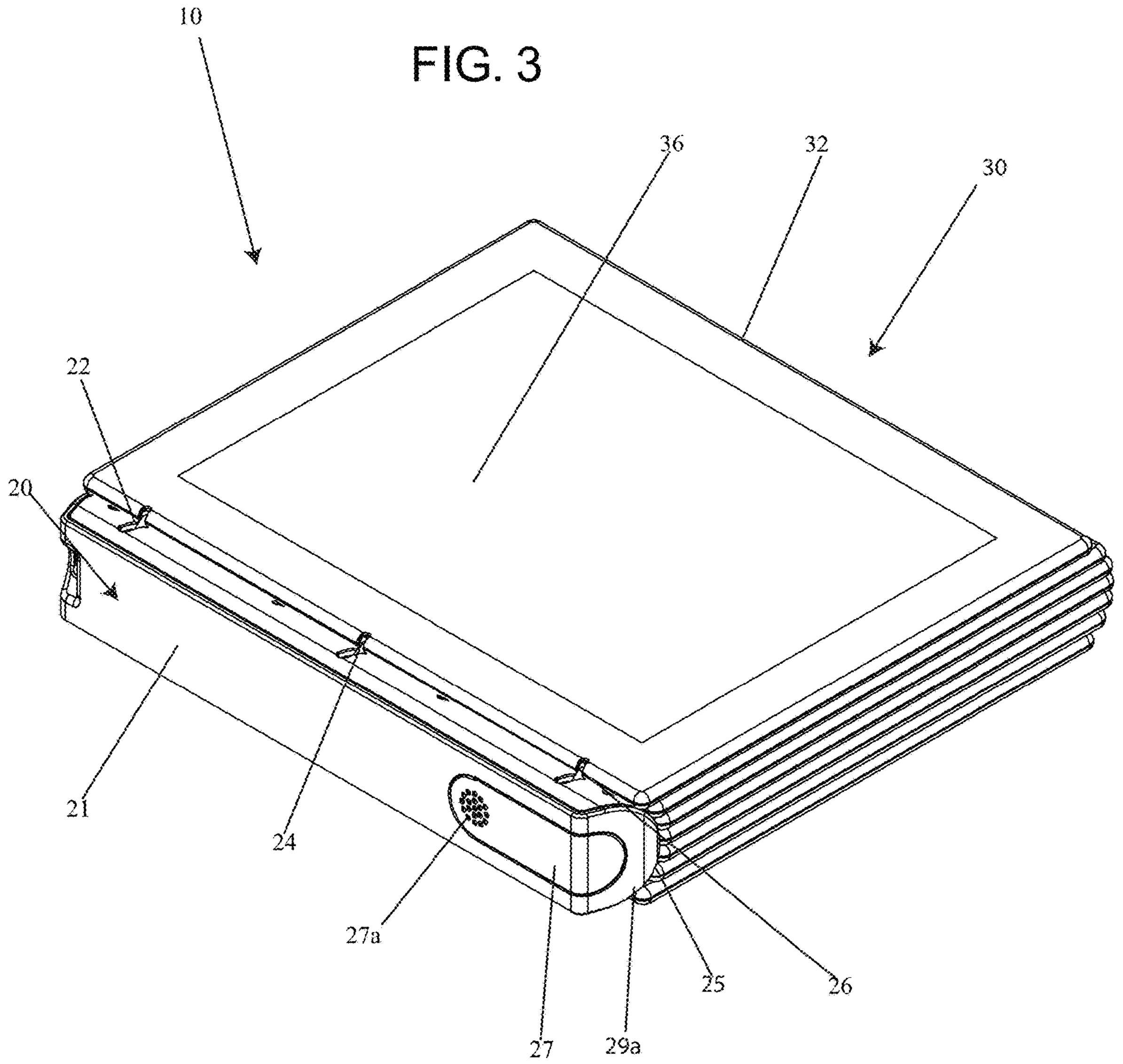
FIG. 3 is a left side-front perspective view of the book of FIG. 1.

FIG. 3 is a perspective view of book device 10 which shows binder 20, clips 22, 24, and 26 as well as page 30 with outer frame 32, and center section or sheet 36. The back of binder 20 includes a plate section 21. Back plate section 21 is removable. There is also another slidable plate 27 which allows for removal from back plate. Slidable plate 27 is configured to allow batteries to be removed or inserted into the binder. Slidable plate 27 can have a series of perforations 27*a* which can be used to open the slidable front or for an opening for a speaker in the device. Clips 22, 24, 26 are used to clip in pages 30 into the booklet. The clips 22, 24 and 26 coupled to binder 20 secures pages 30, 40 in the binder and allow for electrical connection so that the pages can be powered by the binder from batteries stored in the binder. Power extends through the section adjacent to clip 24 and into each of the pages. Essentially, clip 24 serves as a conduit for power from a set of batteries stored in binder 20. Also shown is bottom portion 29*a* of binder 20 as well as round front 25.

Figure 4:
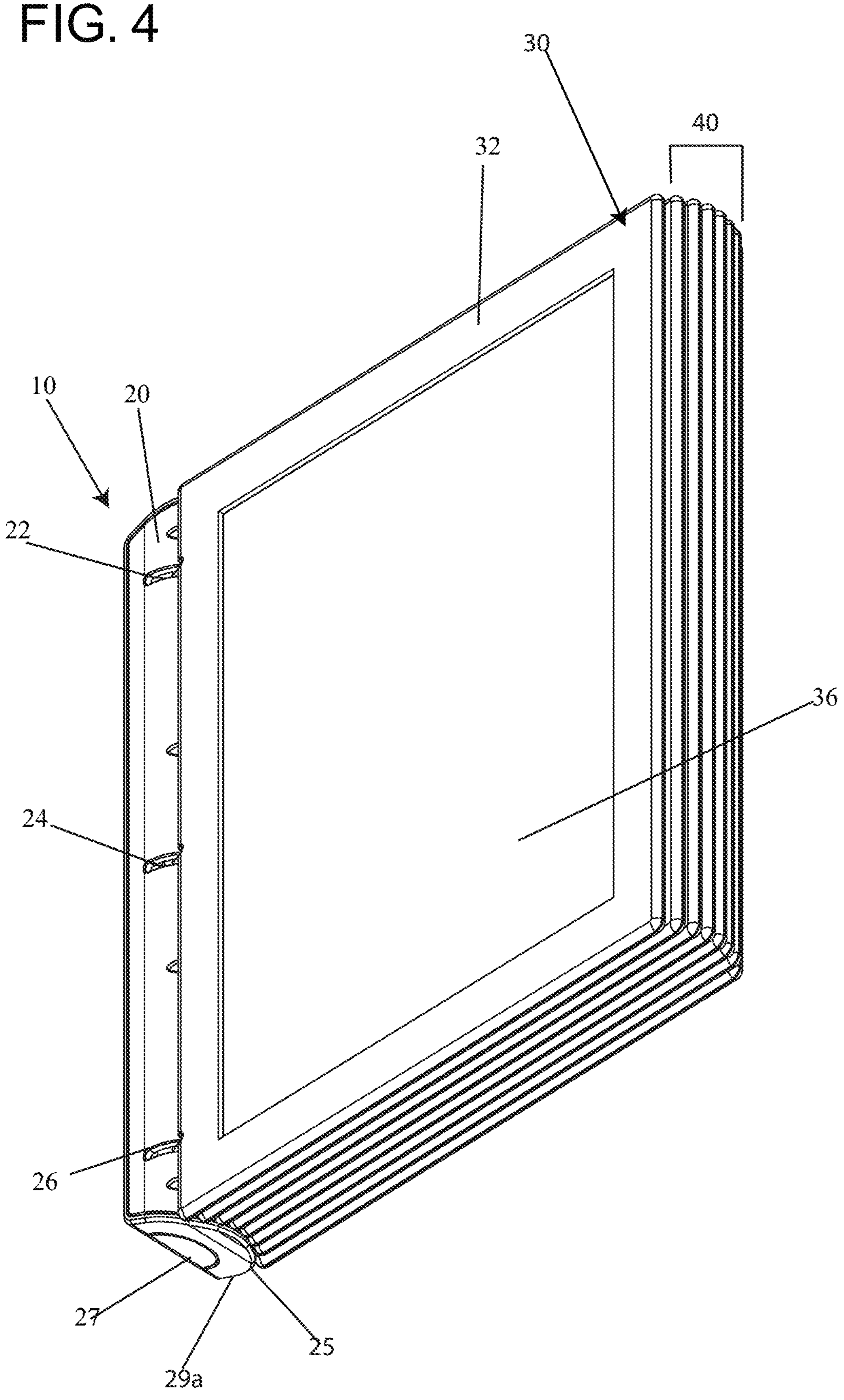
FIG. 4 is a bottom-front perspective view of the book of FIG. 1.

FIG. 4 is also a front bottom perspective view of this design of device 10 which shows binder 20, clips 22, 24, 26, slidable plate 27 wherein binder 20 is shown having a round front 25 which intersects with pages 30 and 40. Page 30 is shown having outer frame 32 and center region or sheet 36. There is also a bottom portion 29*a* which allows slidable plate 27 to be selectively removable from the binder 20.

Figure 5A:
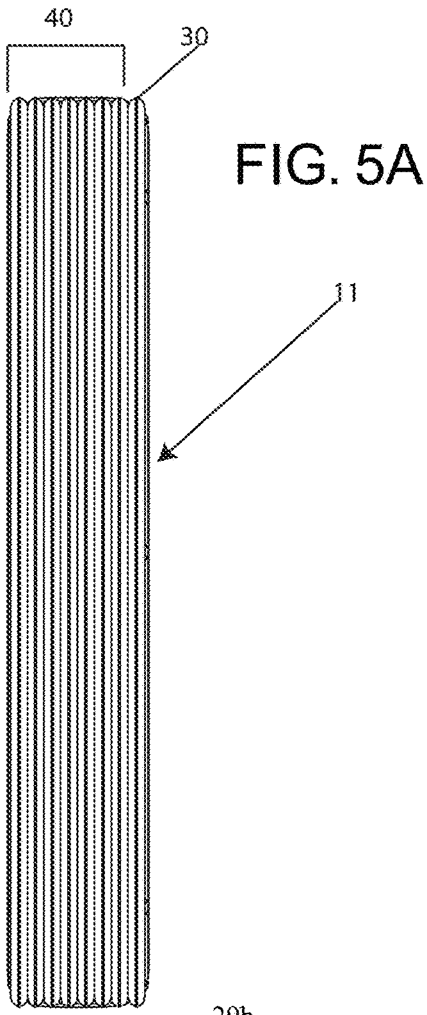
FIG. 5A is a bottom view of the book.
Figure 5B:
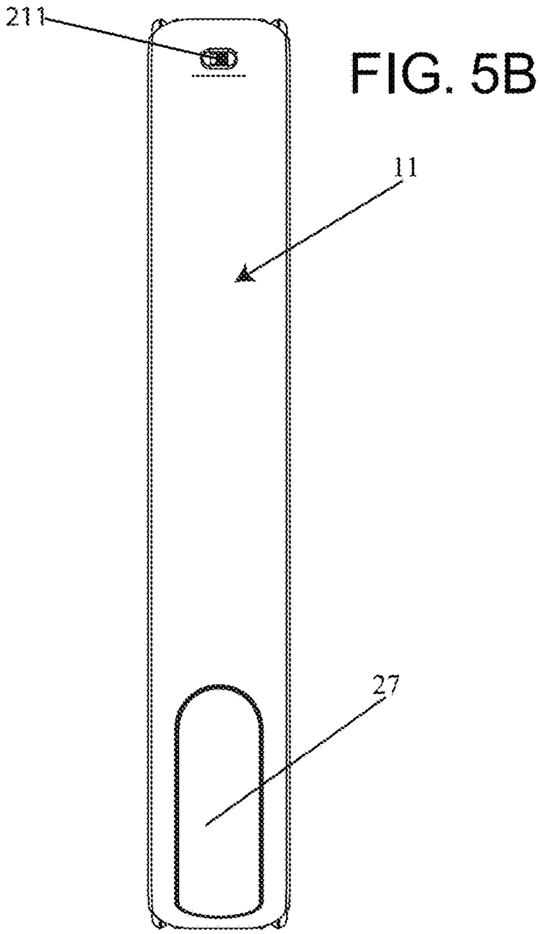
FIG. 5B is a left side view of the book according to the orientation of FIG. 1.
Figure 5C:
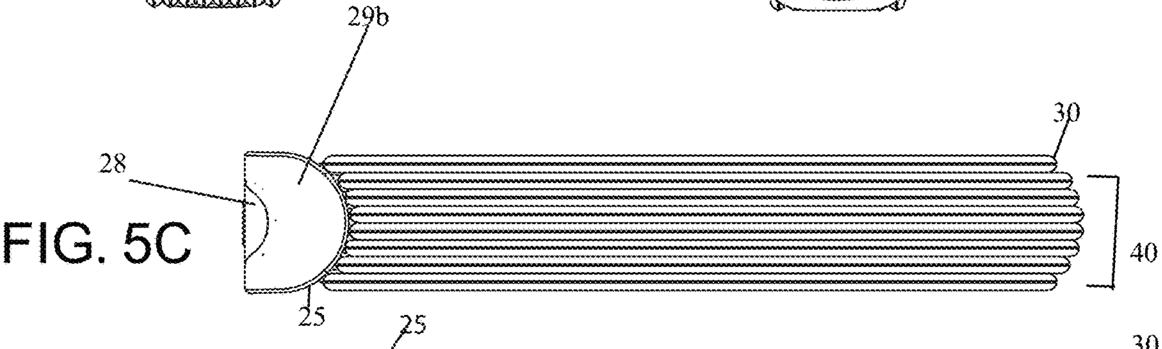
FIG. 5C is a right-side view of the book.
Figure 5D:
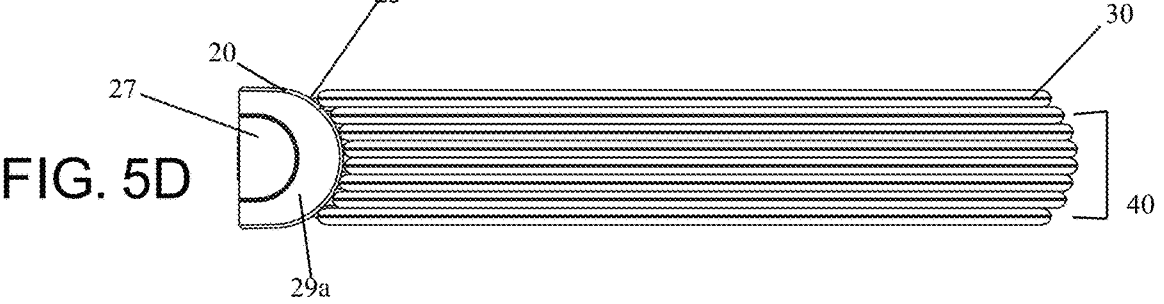
FIG. 5D is a bottom view of the book.

FIG. 5A is an end view of the second embodiment or device 11 wherein with this second embodiment wherein a first page 30 and a series of second pages 40 are shown. With this embodiment shown in FIG. 5B an on/off switch or button 211 is shown which can turn the device 11 on and off. There is also slidable plate 27 which can be slid on and off of binder 20. A top view in FIG. 5C shows a top end 29*b* as well as bridge 28. Pages 30 and 40 are shown wherein page 30 is shown in greater detail in FIG. 15 which shows a thin sheet 36 covering a back sheet 33 wherein a paper sheet fits therein. FIG. 5D shows a bottom view of the book showing plate 27, binder 20 round front 25 and bottom end 29*a*.

Figure 6A:
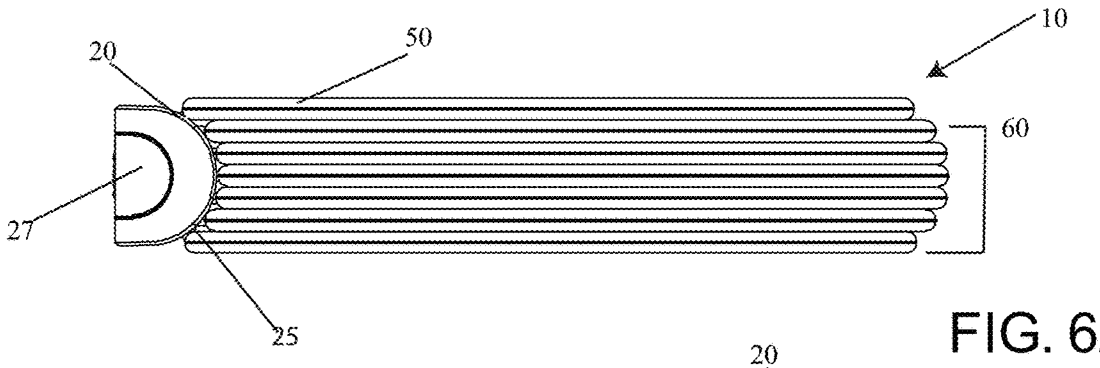
FIG. 6A is a is a right-side view of the book with a different set of pages.

FIG. 6A is a bottom view of the device 10 which includes top page 50 and the remaining pages 60 as well as well as the slidable plate 27 and binder 20 having a curved front 25. This set of pages is a second set of pages which is thicker and allows for a removal of a front bracket such as bracket or outer frame 52 (see FIG. 7) to allow for a sheet to be slid underneath front cover 56. Because the binder 25 has a curved front it causes the remaining pages 60 to extend out in a curved manner.

Figure 6B:
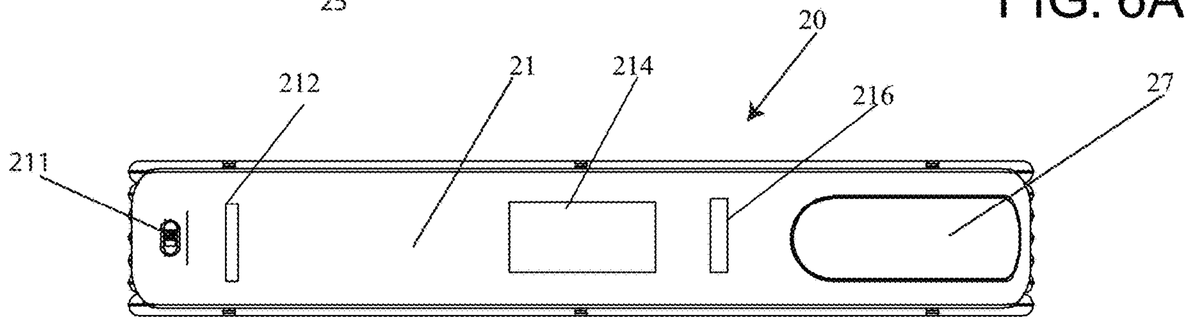
FIG. 6B is a left side view of the book.
Figure 6C:
FIG. 6C is a bottom view of the book.

FIG. 6B is an end view of the book device 10 which shows binder 20 having an on/off button 211, a slot for receiving a memory card 212, a back face, bracket, or plate section 21, a speaker 214, a slot for charging (USB for example) 216 (See also FIG. 24) and a removable or slidable plate 27 which grants access to the battery. FIG. 6C is an opposite end view which shows page 50 and remaining pages 60.

Figure 6D:
FIG. 6D is a top view of the book.

FIG. 6D is a top view of the book including first page 50 and pages 60 as well as curved front end 25 bottom end 29*b*, and bridge 28.

Figure 7:
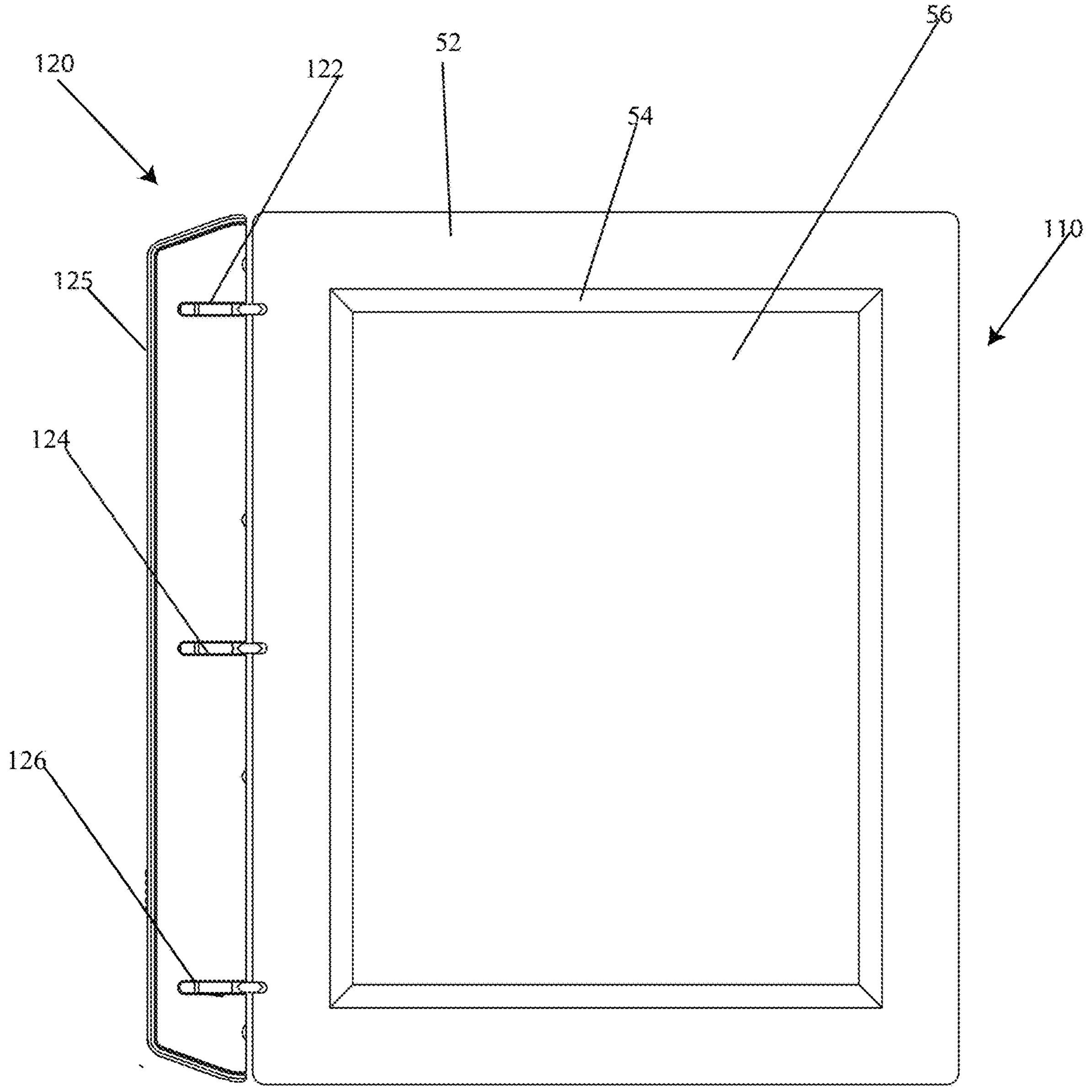
FIG. 7 is a front view of another book with a rectangular binder.

FIG. 7 is another embodiment of book device 110 which shows another type of pages such as pages 50 and 60 to be used with a book. For example, page 50 includes an outer frame 52, inner frame or bracket 54 and a top sheet 56. This top sheet can be made from plexi-glass or acrylic. There is a binder 120 with clips 122, 124, and 126. There is also shown binder back 125 as well. Top sheet 56 covers pages when the pages are inserted or applied over the sheet therein.

Figure 8:
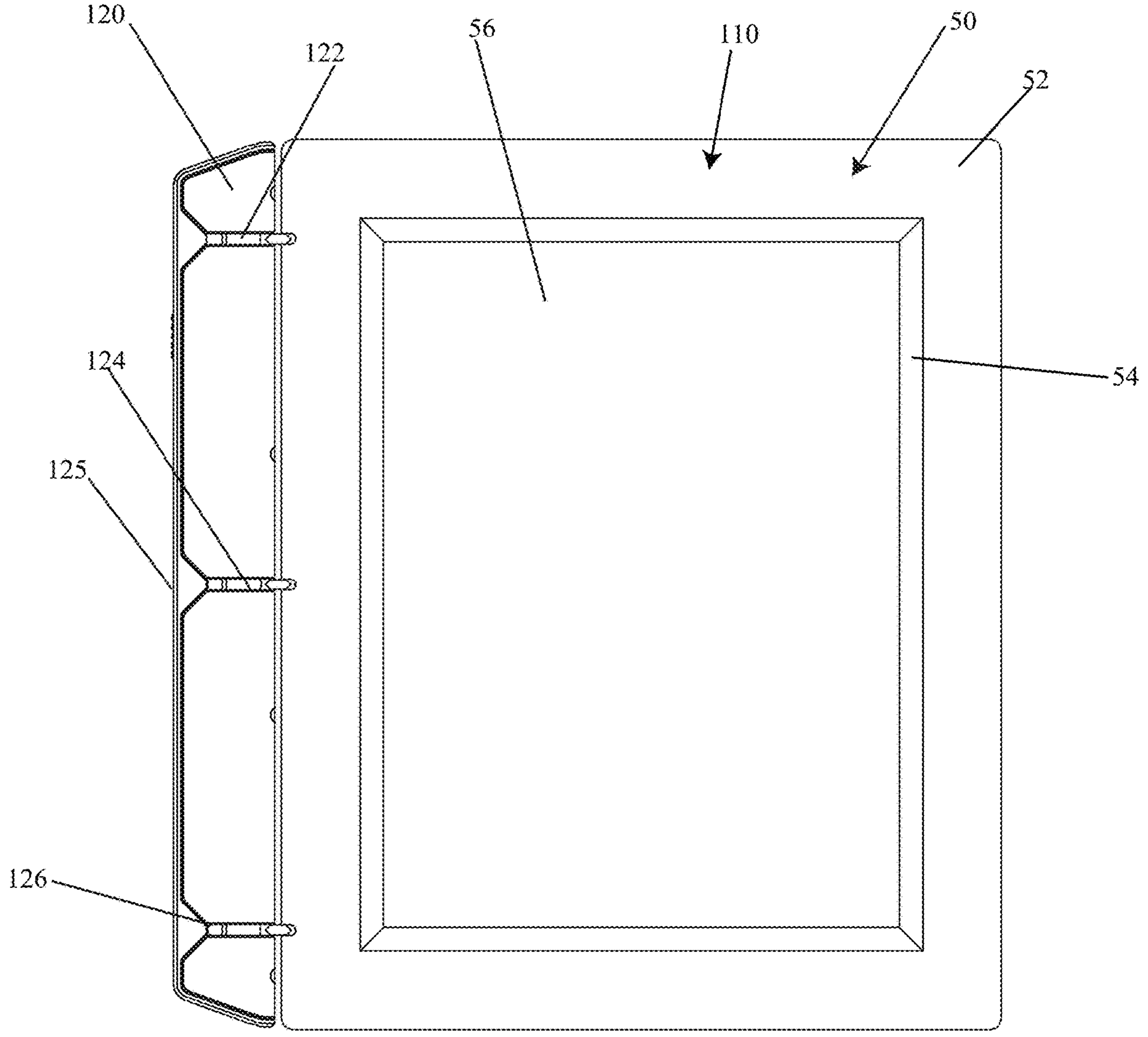
FIG. 8 is a back view of a book with a rectangular binder.

FIG. 8 is a back view of embodiment 110 which shows pages 50 which has an outer fame 52, an inner frame or bracket 54 and a center cover or sheet 56. There are clips 122, 124 and 126 positioned inside of bracket or binder 120 and back bracket 125.

Figure 9:
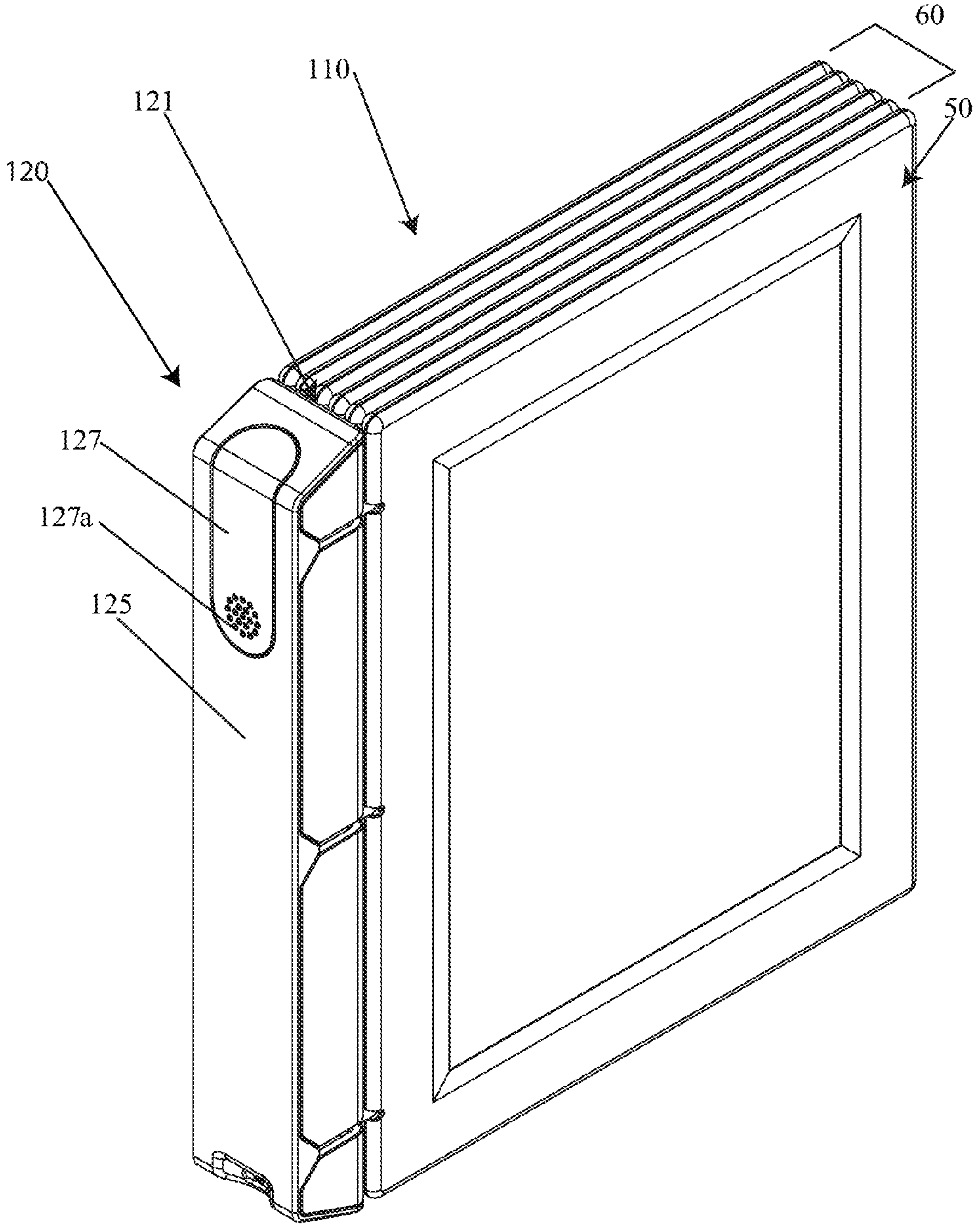
FIG. 9 is a top-front-perspective view of a book with a rectangular binder.

FIG. 9 shows a back side view of an embodiment of book device 110 which shows binder 120 having a slidable bracket 127, a back face 125 a first page 50 and a series of other pages 60. There is also a flat front face 121 which intersects with the pages with a flat face 121.

Figure 10:
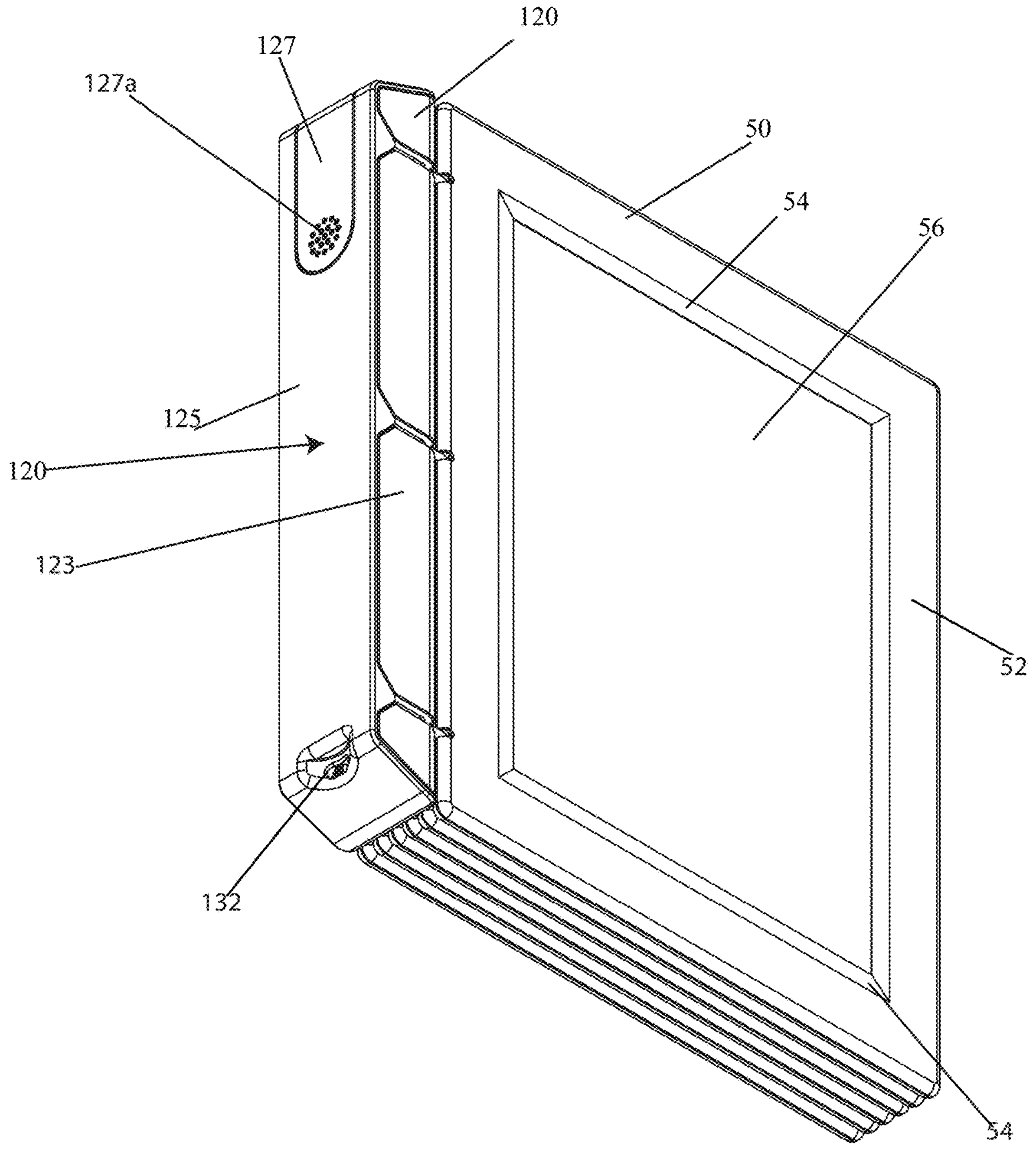
FIG. 10 is a bottom front perspective view of the book with a rectangular binder.

FIG. 10 is a bottom perspective view of a rectangular binder embodiment with a rectangular binder 120. A slidable back 127 is shown with a perforated opening 127*a* which can be used to allow the slidable back 127 to slide off of back face 125. This perforated opening can also be used as an opening for a speaker projection. Page 50 has outer frame 52, inner frame or bracket 54 and cover plate or sheet 56 shown therein. Side plate 123 is shown coupled to bracket or binder 120 as well.

FIG. 11A is an end view of the book device 110 which has pages 50 and 60 while FIG. 11B is a bottom view of this book having binder 120 with slidable bracket 127. Pages 50 and 60 are shown. FIG. 11B shows binder 120 with slidable plate 127 with pages 50 and 60 shown, wherein these pages intersect at a flat face 121 of binder 120.

FIG. 11C shows a top view of the book device 110 with binder 120 and having bridge 128 shown. FIG. 11D shows an end view of binder 120 which slidable bracket 127 and on/off switch 211 shown. The pages 50 and 60 of this embodiment are shown in greater detail in FIG. 16.

Figure 12A:
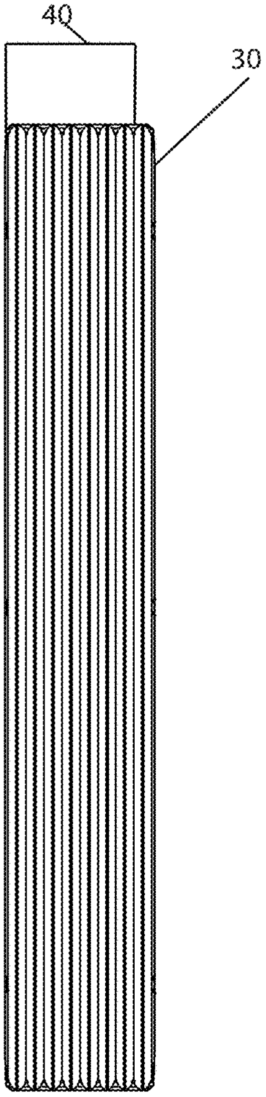
FIG. 12A is a right-side view of the book shown in FIG. 7 with a second set of pages.
Figure 12B:
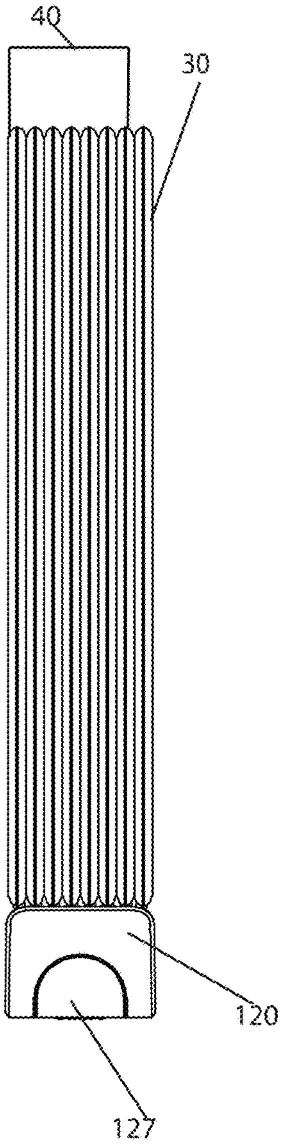
FIG. 12B is a top view of a book shown in FIG. 7 with a second set of pages.
Figure 12C:
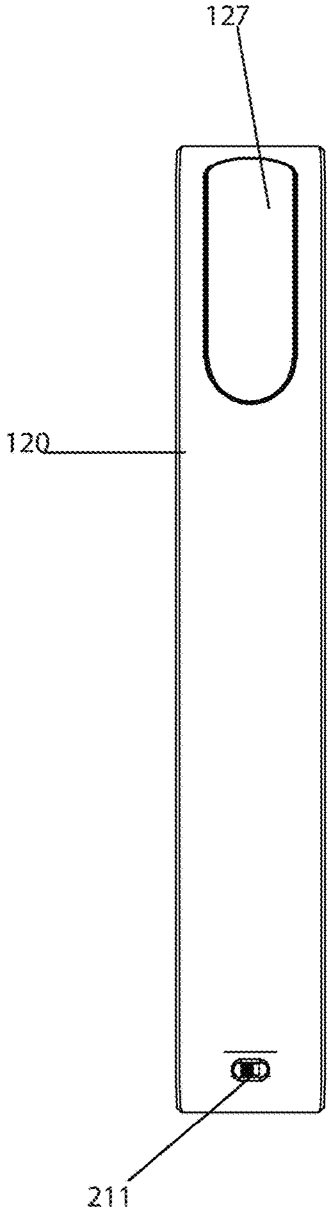
FIG. 12C is a left side view of the book shown in FIG. 7.

FIG. 12A shows an end view with pages 30 and 40. FIG. 12B shows a bottom view with pages 30 and 40 and bracket or binder 120 with slidable back 127 in bracket or binder 120 while FIG. 12C shows a side view with bracket or binder 120 with slidable back 127 and on/off switch 211 in binder 120.

Figure 13A:
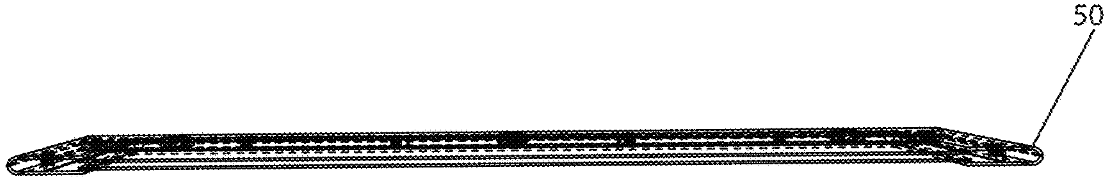
FIG. 13A is a cross sectional view of a first set of pages.
Figure 13B:
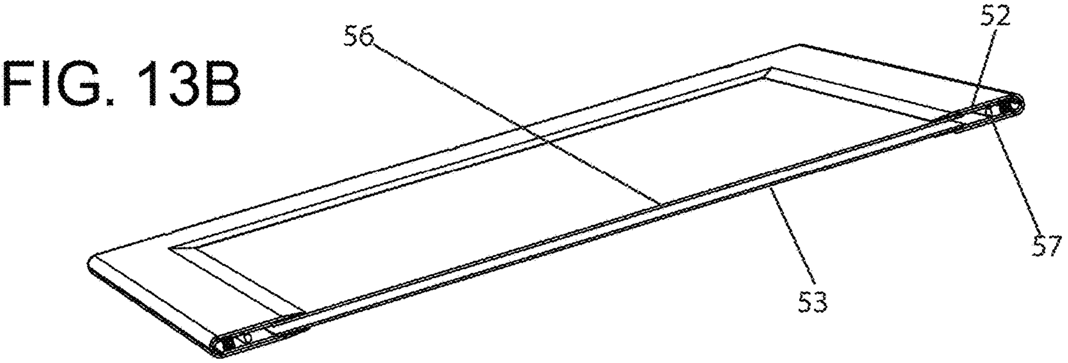
FIG. 13B is a cross sectional view of a second set of pages.

FIG. 13A is a cross sectional view of pages 50 while FIG. 13B is another cross-sectional view of pages 50 wherein there are sheets or covers 56 and 53 which are shown extending parallel or substantially parallel to each other as well as outer frame sections 52 and 57 positioned opposite each other. The term substantially, allows for a deviation of approximately 10% or 10 degrees from the expressed term. Therefore if the pages are listed as substantially parallel to each other then the pages intersect at an angle of not more than 10 degrees or are perfectly parallel to each other.

FIG. 13B is a side cross-sectional view with sheets 56, and 53 with brackets or outer frame 52 and 57 spaced opposite each other with sheets 56 and 53 spaced opposite each other. Paper sheets can be slid in between sheets 56 and 53 or placed over the sheets wherein these paper sheets can be illuminated by a light disposed inside of brackets or outer frame 52 and 57.

Figure 13C:
FIG. 13C is a side view of a set of pages of a book.

FIG. 13C is a side view of a page 50 with clips 58 which are configured to connect to respective clips 22, 24 and 26 in binder 20 or clips 122, 124 and 126 in binder 120 (See for example FIG. 7).

Figure 13D:
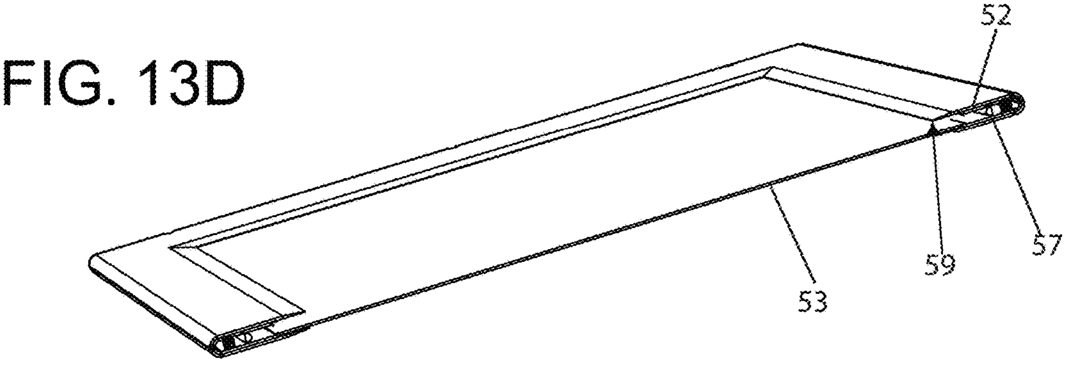
FIG. 13D is an end view of a set of pages of a book.

FIG. 13D shows a side or end cut-away view which shows sheet 53, bracket or outer frame 52 as well as bracket 54 which serves as a clamp when a display sheet such as a paper sheet is inserted in gap 59 front of acrylic or plexiglass sheet 53 but clamped by bracket 54 against the sheet. On the other side of sheet 53, another display sheet can be clamped by a bracket 54 closing on sheet 53.

Figure 14:
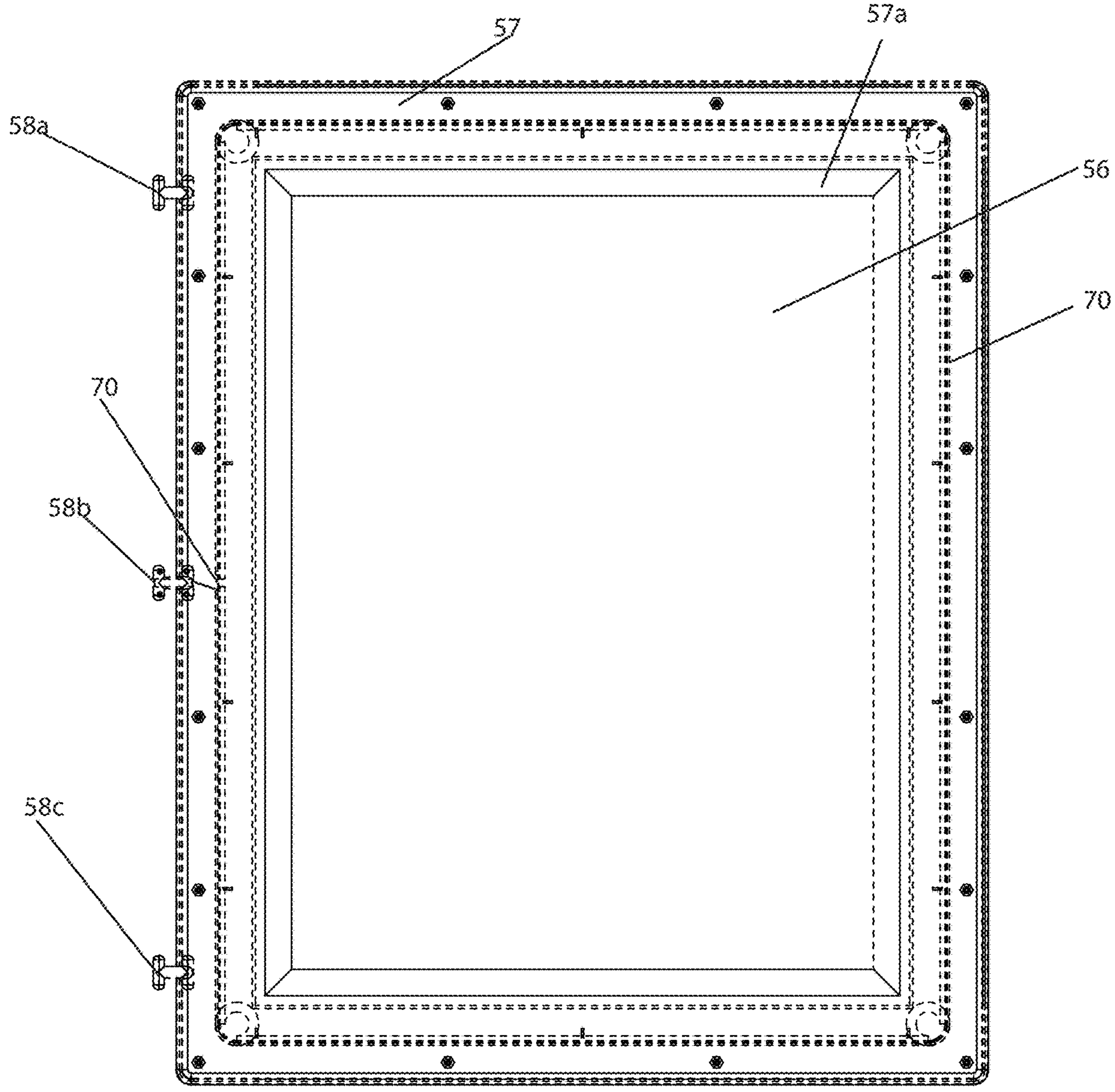
FIG. 14 is a transparent view of a book.

FIG. 14 is a transparent view of a back bracket view of bracket 57 having a series of clips 58*a*, 58*b*, and 58*c* which are configured to couple to respective clips 22, 24, and 26 (See FIG. 1) or other clips 122, 124, and 126 (See FIG. 7). Disposed in an inner ring is an LED strip 70 which is configured to light the inner sheets 56 and 53 up so that a paper applied over or placed inside bracket 57 is lit up. This LED strip 70 encircles the inner sheets 56 and 53 and shines an inner reflected and/or refracted light on the sheets. As disclosed above, two sheets 53 and 56 can be used, or a single sheet 53 can be used. Back bracket 57 has an inner frame 57*a* (similar to frame 54) for framing the sheets or paper. LED strip 70 is powered from power extending in from clip 58*b*. Clip 58*b* is coupled to clip 24 or 124 for example, which thereby provides power from an associated battery stored inside of an associated binder.

Figure 15:
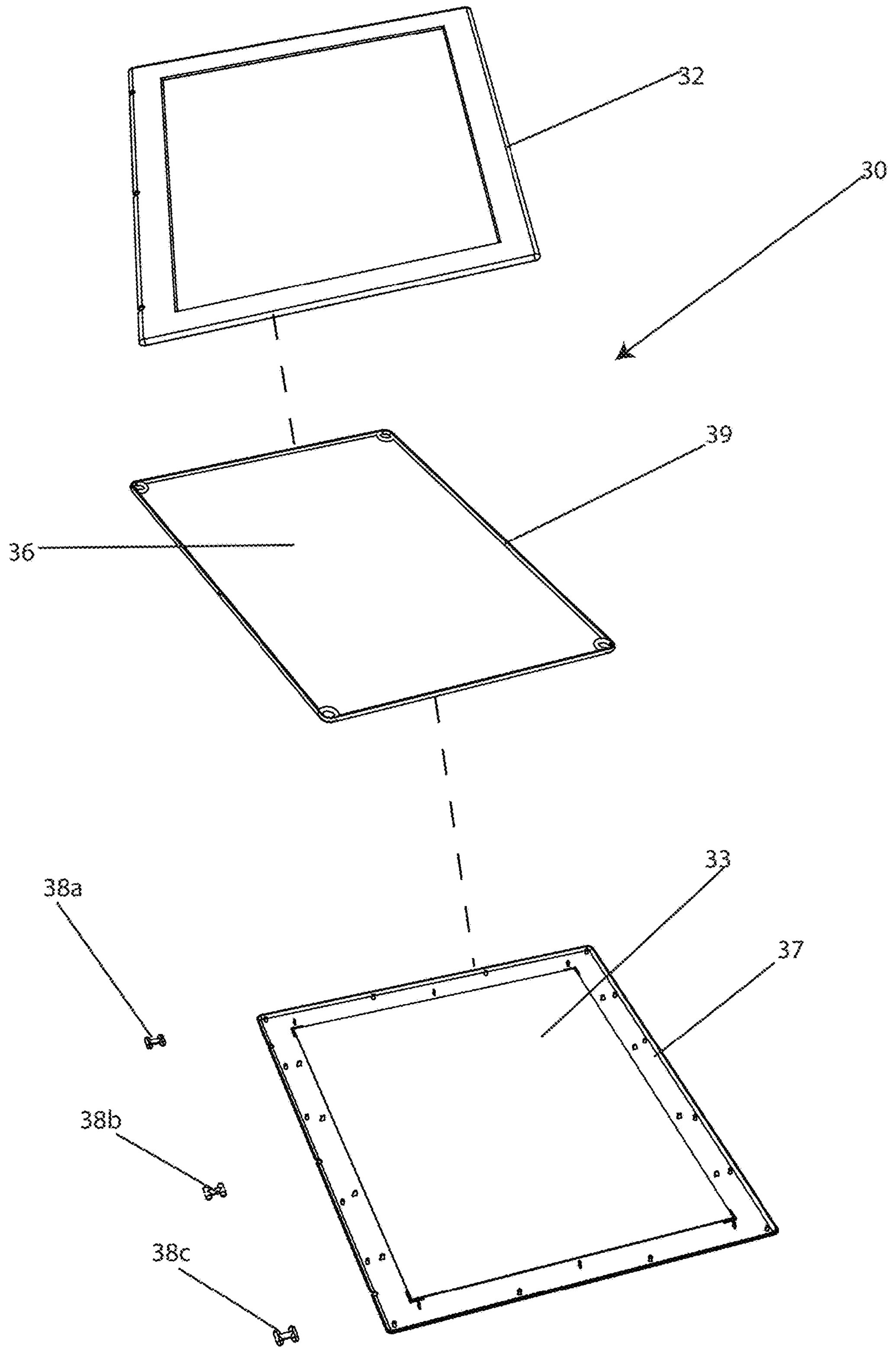
FIG. 15 is an exploded view of a set of pages.

FIG. 15 is an exploded view of a sheet or page 30 which includes a front bracket or outer frame 32, a top sheet 36 and a back bracket having a back sheet 33. There are clips 38*a*, 38*b*, and 38*c* which are coupled to the bracket or outer frame 32, and 37 and which connect the bracket to the associated binder, to clips 22, 24, and 26 or to clips 122, 124, and 126 (See FIG. 1 or 7). In this view the back bracket 37 having sheet 33 is coupled to sheet 36 such that sheet 36 is laid therein with frame or rim 39 sitting in back bracket 37 and covered by front bracket or outer frame 32. Front bracket or outer frame 32 is placed over sheet 36 to lock sheet in place on top of sheet 33 with rim 39 providing spacing between sheet 33 and 36.

Figure 16A:
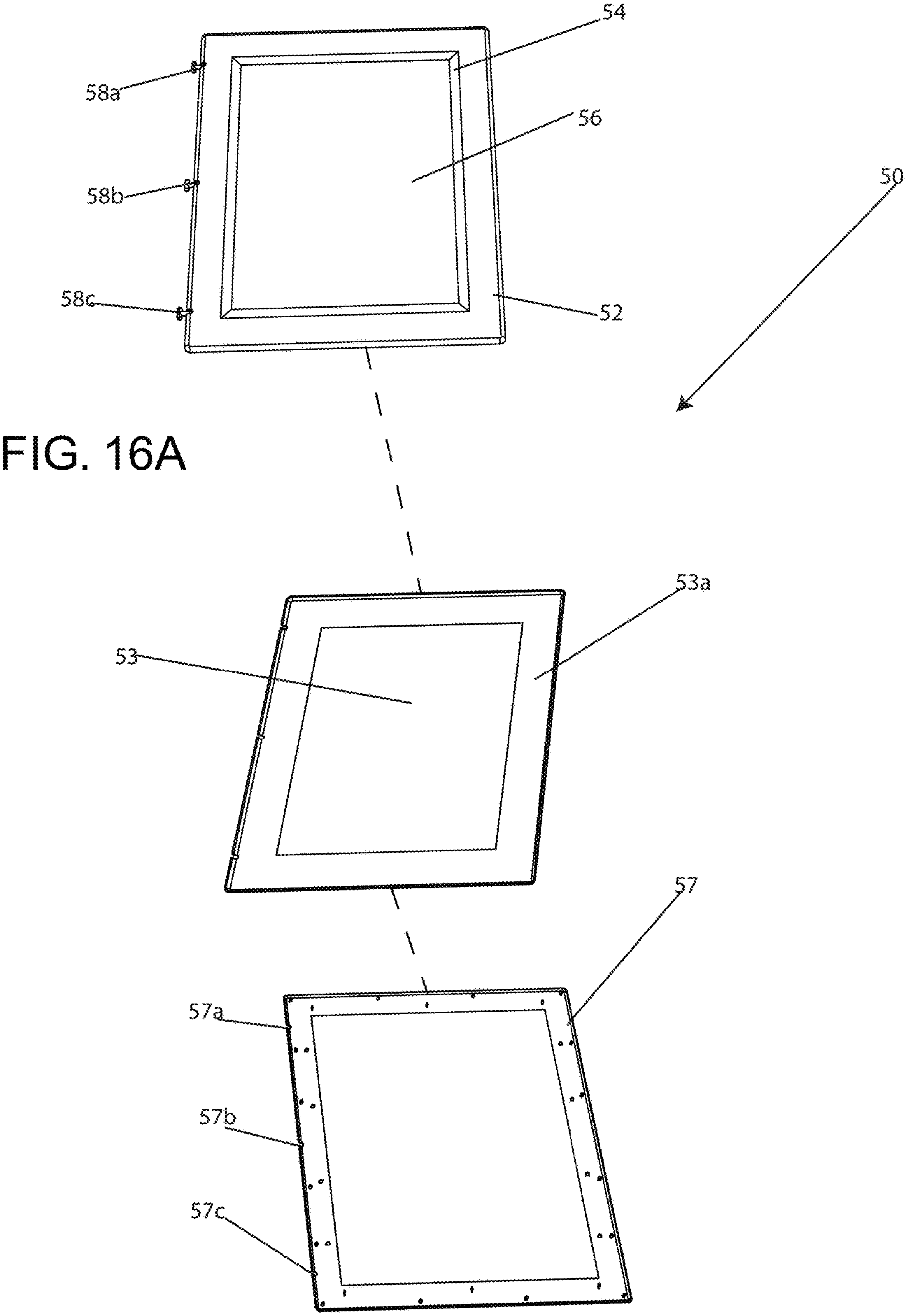
FIG. 16A is another exploded view of a set of pages.

FIG. 16A is an exploded view of page 50 which includes an outer bracket 52 an inner bracket 54 as well as a sheet 56 which sits inside of a frame or outer bracket 52. There is a second sheet 53 having an outer rim 53*a*. Outer rim 53*a* is configured to sit within bracket 57. Back bracket 57 has notches 57*a*, 57*b*, and 57*c* for receiving associated clips such as clips 58*a*, 58*b*, and 58*c* or clips 38*a*, 38*b*, and 38*c*.

Figure 16B:
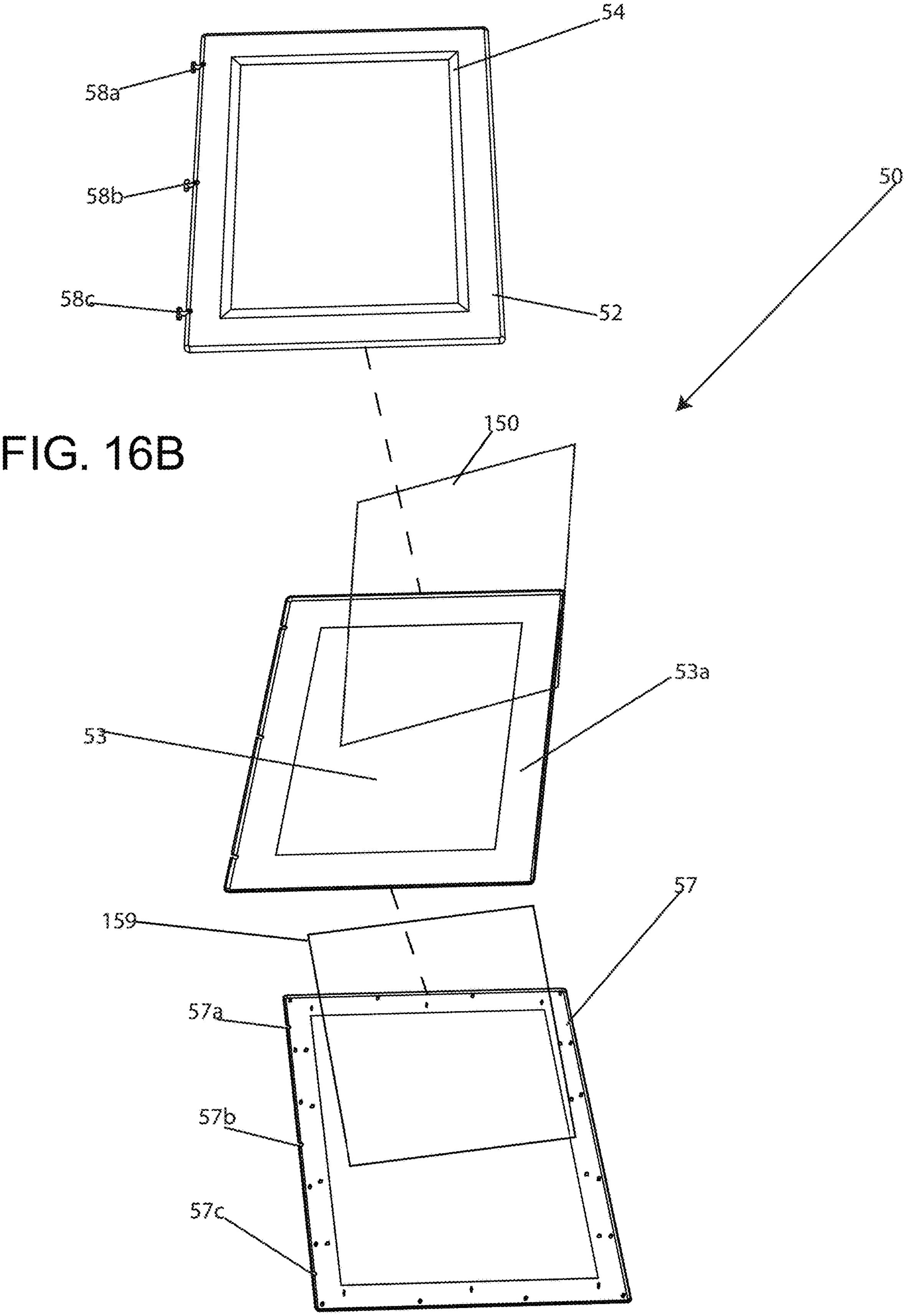
FIG. 16B is another view of a set of pages.

FIG. 16B shows a similar sheet which shows frame 52, inner bracket 54, but no sheet 56. Instead, a single sheet 53 is shown having an outer rim 53*a*. A display sheet 150 is shown which can be laid down on top of sheet 53, and then clamped to sheet 53 via inner bracket 54. Another sheet 159 is also shown being clamped on the other side to form a display sheet on the opposite face of acrylic display sheet 53. FIGS. 16A and 16B also show a series of clips 58*a*, 58*b*, and 58*c* as well. Sheets 150 and 159 can be in the form of decorative story telling sheets which include artwork and which are configured to be lit such as backlit by a lighted sheet such as sheet 53. These artwork sheets can be used to tell a story or to teach a student. Alternatively, these sheets 150 and 159 are configured to be stored inside of sheets 53 and 56 and illuminated by those sheets or stored inside of sheets 33 and 36. If two sheets such as sheets 53 and 56 are used, then the artwork pages 150 and 159 are front lit by sheets 53 and 56. If a single sheet is used such as sheet 53 or sheet 33 then the sheets 150 and 159 are backlit by sheets 33 and 53.

Figure 17:
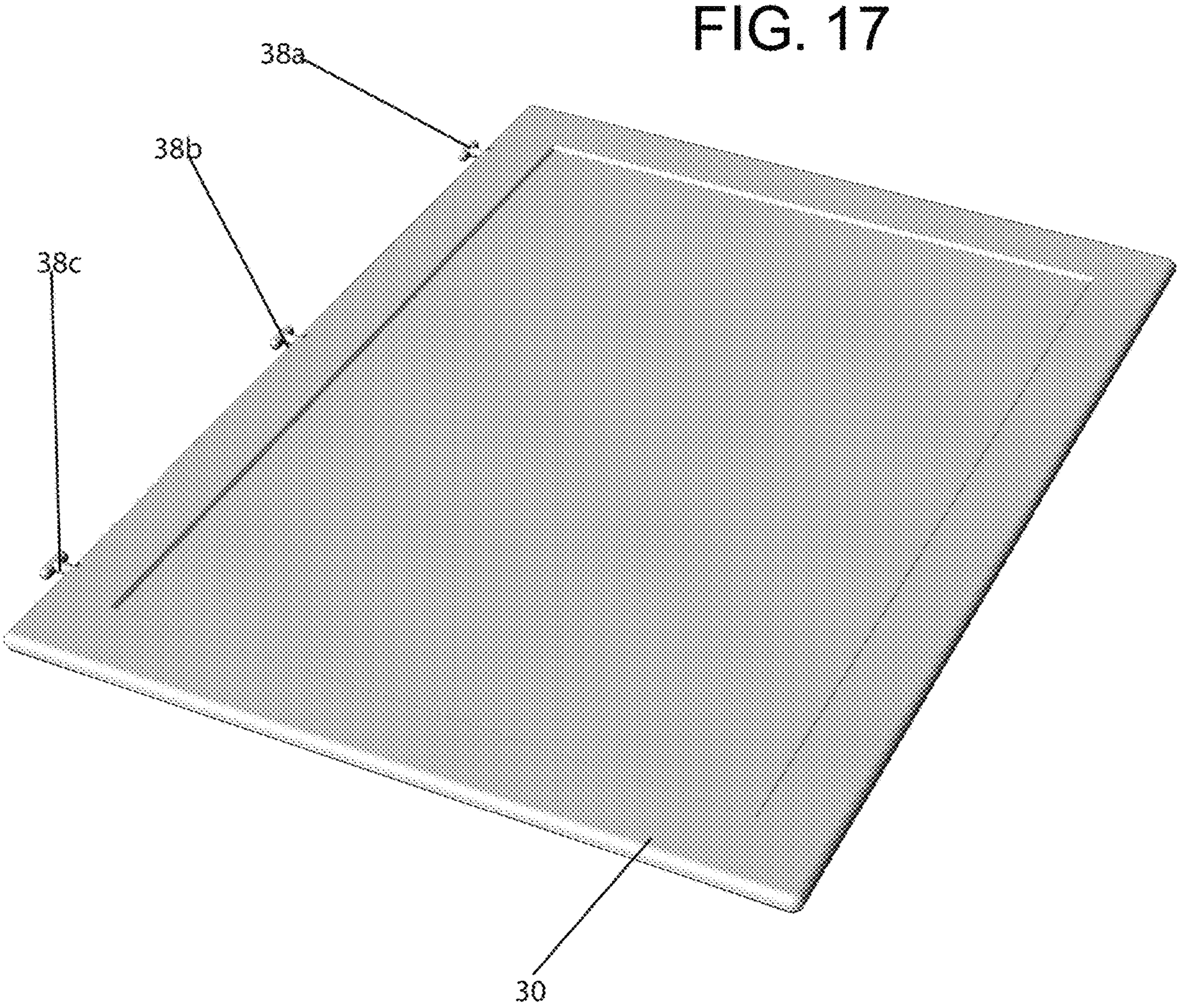
FIG. 17 is a solid view of a page for use with a book.

FIG. 17 is a perspective three dimensional view of page 30 which includes clips 38*a*, 38*b* and 38*c*.

FIG. 18A is a top view of binder 120 having a ring 135. FIG. 18B is an end view of binder 120 which has a back surface 121, a slidable bracket 127, a notched section or perforated opening 127*a* which can correspond to a speaker as well as ring 135. An optional USB charging port 216 is also shown which allows the internal battery such as any one of batteries 160. (See FIG. 24)

FIG. 18C is a perspective view of this binder 120 which has a slidable bracket 127, a notched section or perforated opening 127*a*, a ring 135 This binder 120 also includes a back surface 121 (See FIG. 18D, as well as a side bracket or cover 133 having sections 133*a*, 133*b*, 133*c*, and 133*d* as well as notches 122*a*, 122*b*, and 122*c* to receive clips such as clips 38*a*, 38*b* and 38*c* which then allows for the easy rotation of the pages.

Figure 19:
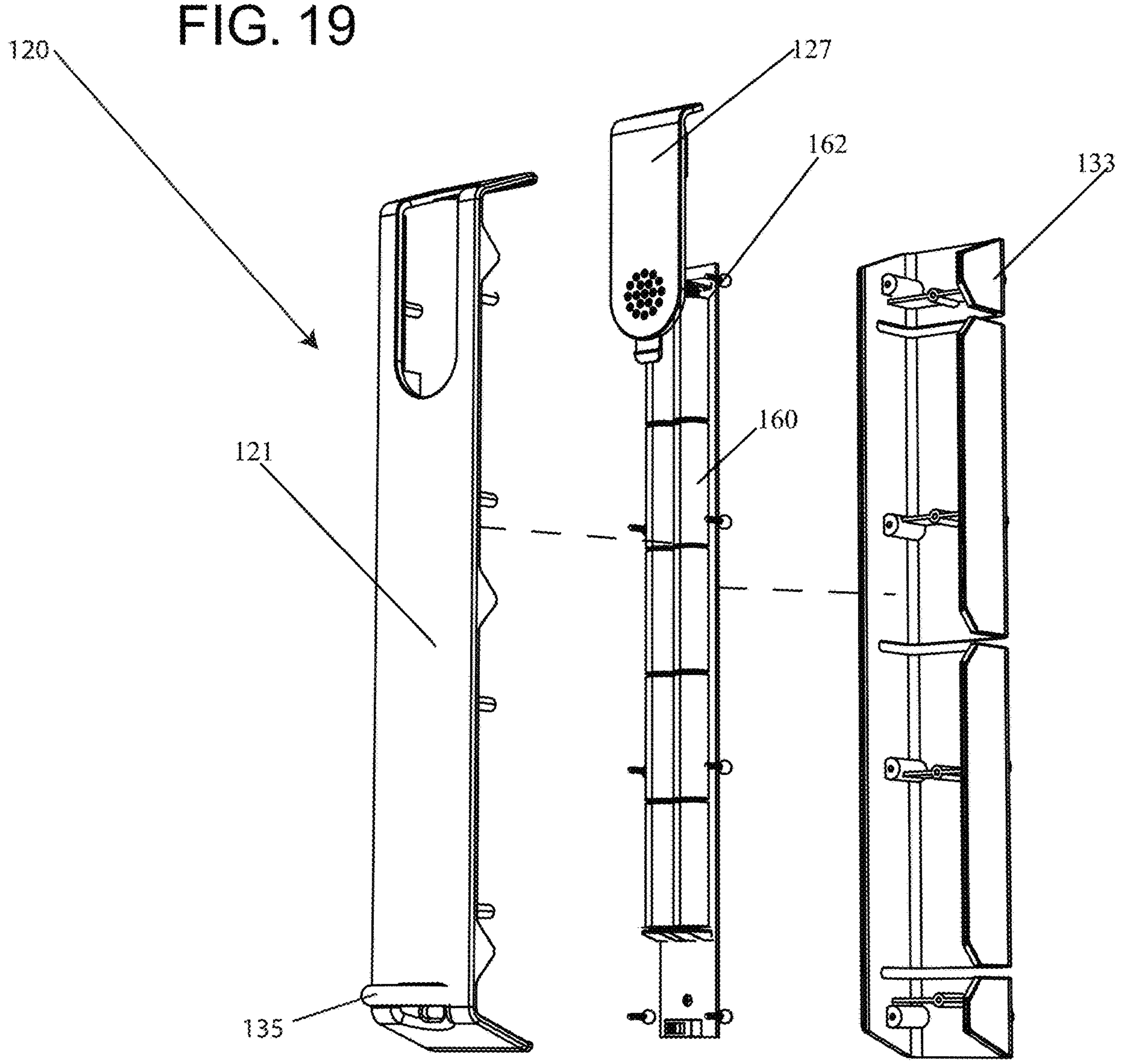
FIG. 19 is an exploded view of the rectangular binder.

FIG. 19 is an exploded view of the rectangular bracket or binder 120. This view shows face 121, slidable bracket 127, a battery pack section 162 as well as a series of batteries 160 which are coupled to the battery pack section 162. There is a front cover 133 which fits over the battery pack 162 and which is configured to mesh with face 121.

Figure 20:
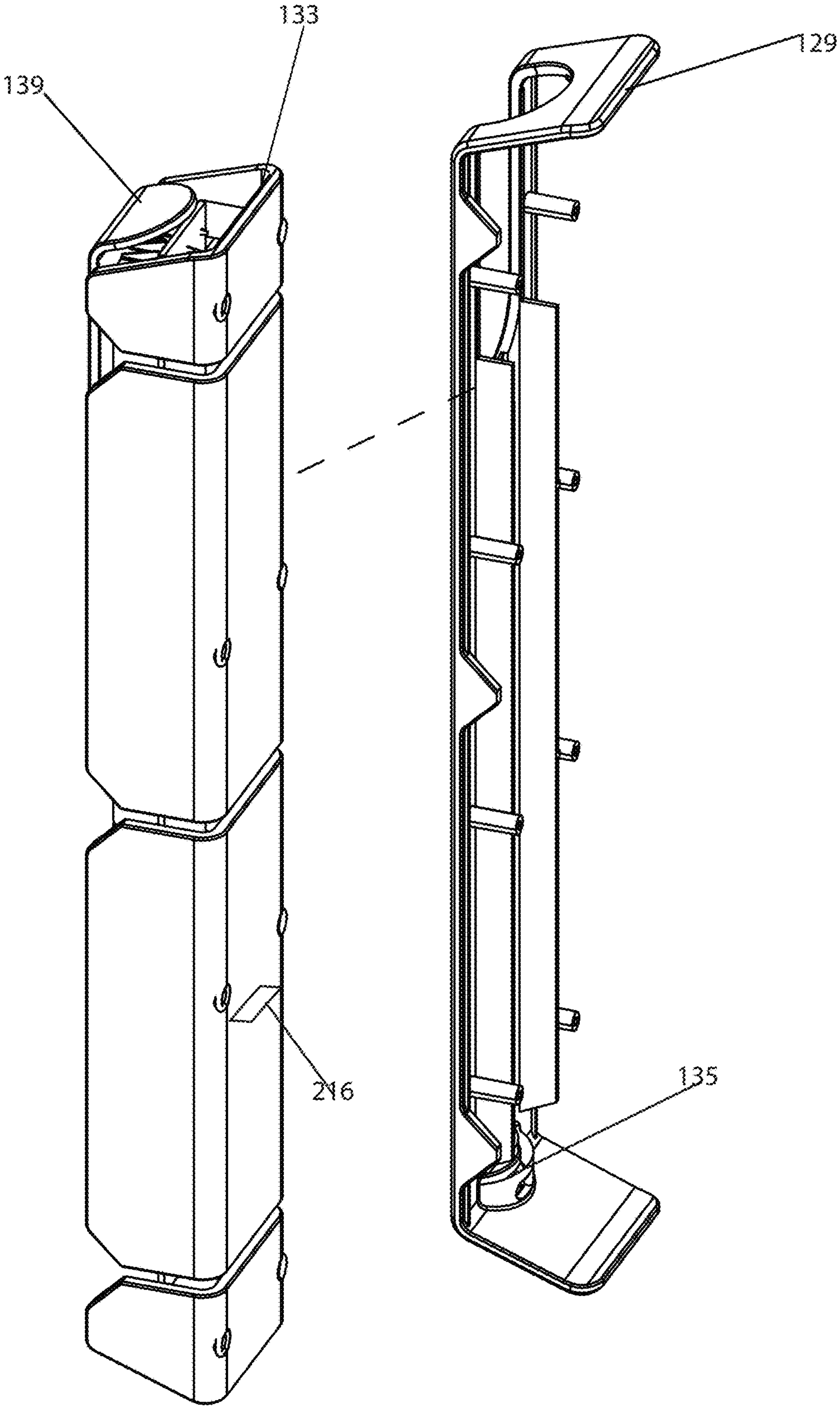
FIG. 20 is another exploded view of the rectangular binder.

FIG. 20 shows an exploded view of bracket or binder 120 with bracket 139, coupled to bracket or front cover 133 as well as bracket 129 pulled out from bracket or front cover 133. There is also shown ring 135 as well as a USB charger 216.

Figure 21:
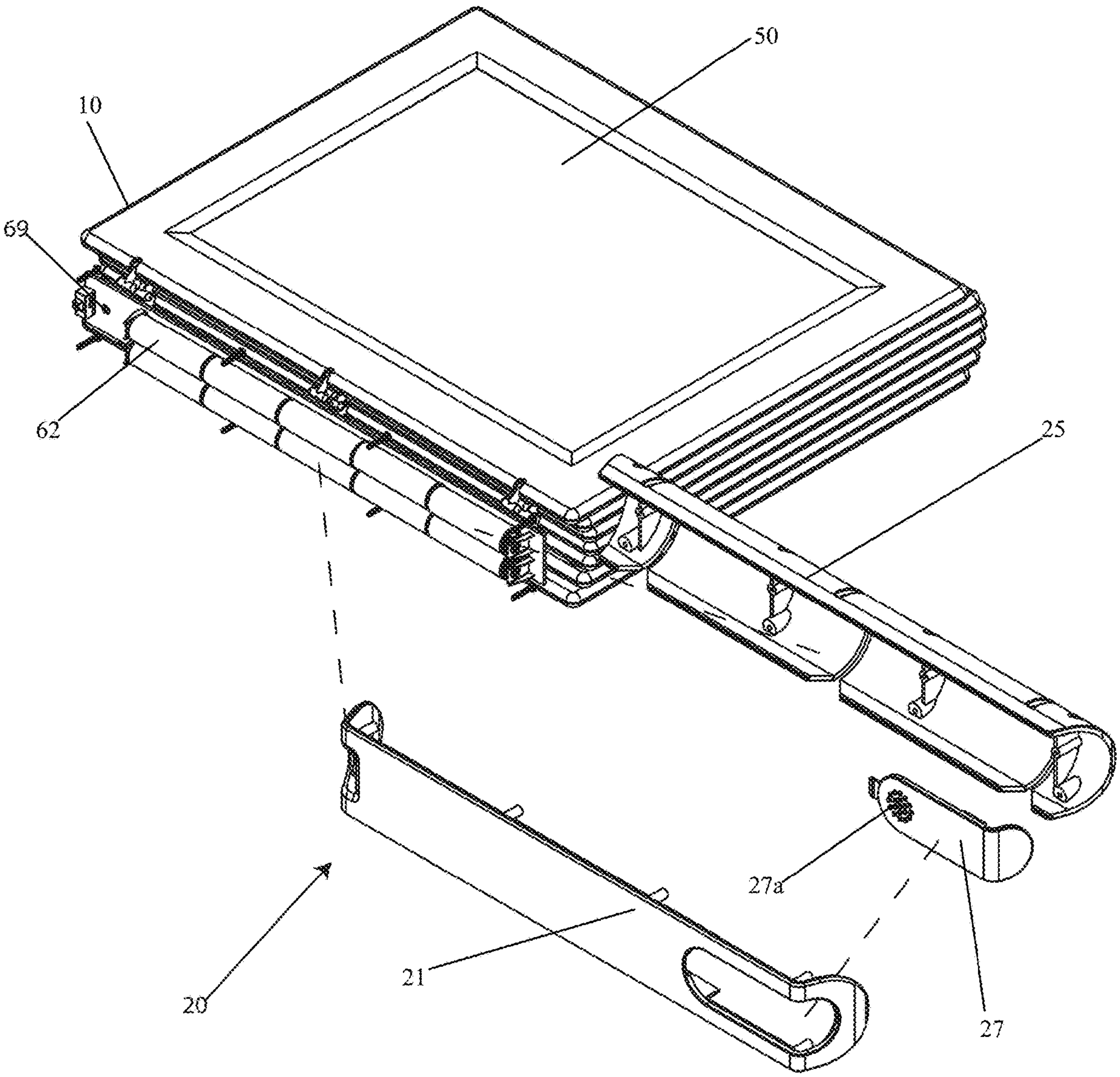
FIG. 21 is an exploded view of the rounded binder.
Figure 22:
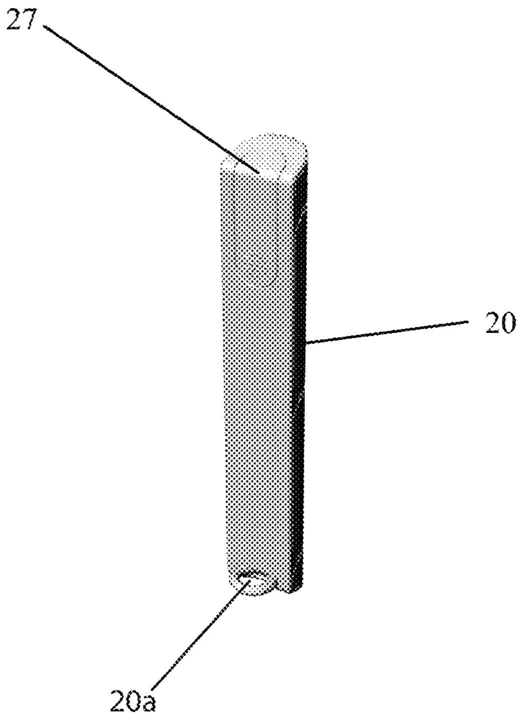
FIG. 22 is a solid perspective view of the rounded binder.

FIG. 21 is a perspective view of the embodiment shown in FIG. 1 which shows bracket front 25 removed from binder 20 In addition, bracket or plate section 21 is also removed thereby showing a battery station 69 for receiving batteries 62. These batteries can be replaceable batteries or rechargeable batteries or both replaceable and rechargeable batteries. Slidable bracket 27 having perforated section 27*a* is also shown removed from back bracket or plate section 21. The assembled version of this binder is shown in FIG. 22 wherein this binder 20 has slidable bracket 27 and ring 20*a*.

Figure 23:
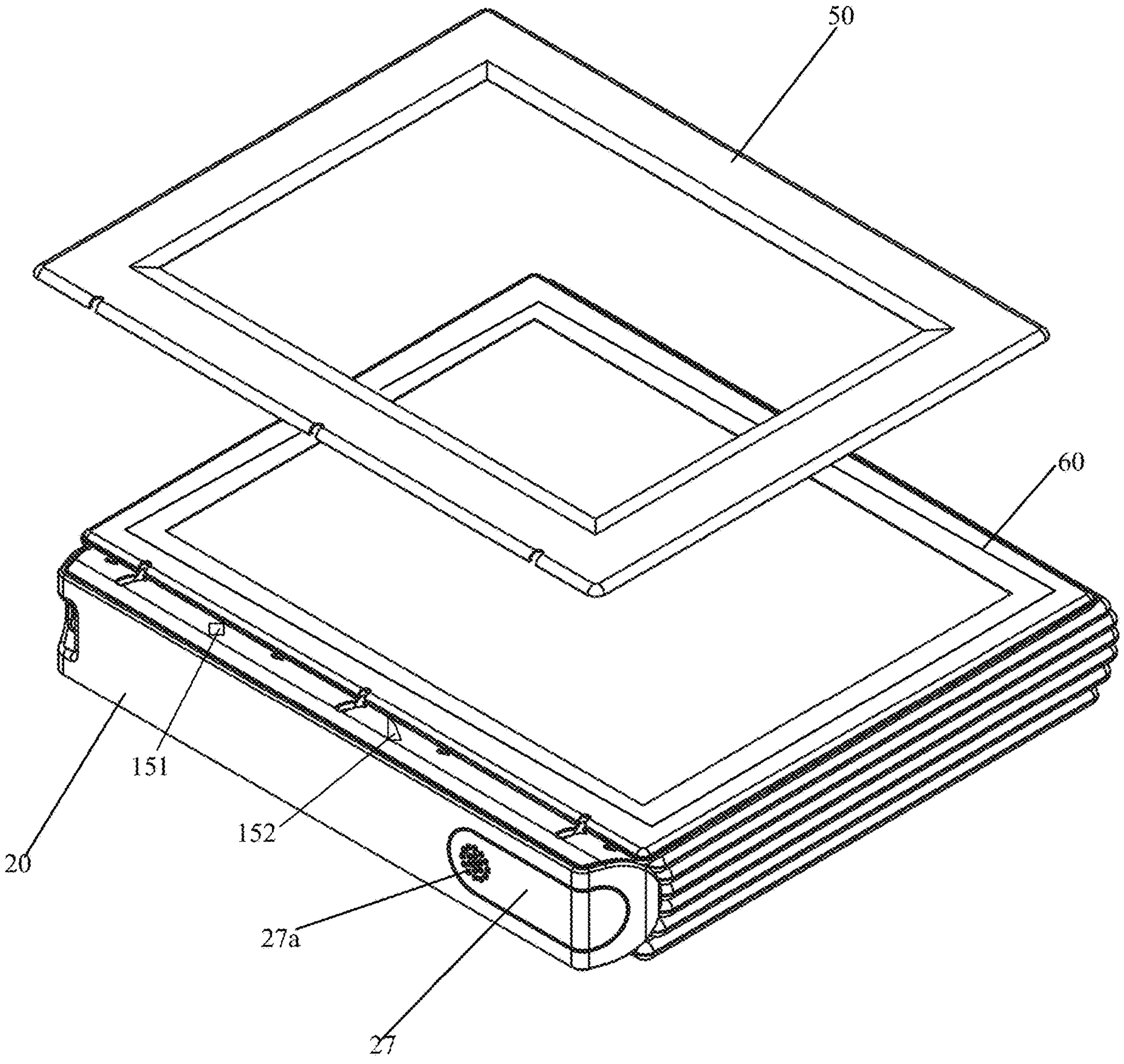
FIG. 23 is an exploded view of the binder with a top plate taken off.

FIG. 23 shows a perspective view of an embodiment with a page 50 removed from a book device 10. Additional pages 60 are positioned under page 50. In addition, exposed are buttons or touch sensors 151 and 152 which when depressed cause pages to light up and even to trigger the playing of an audio recording.

Figure 24:
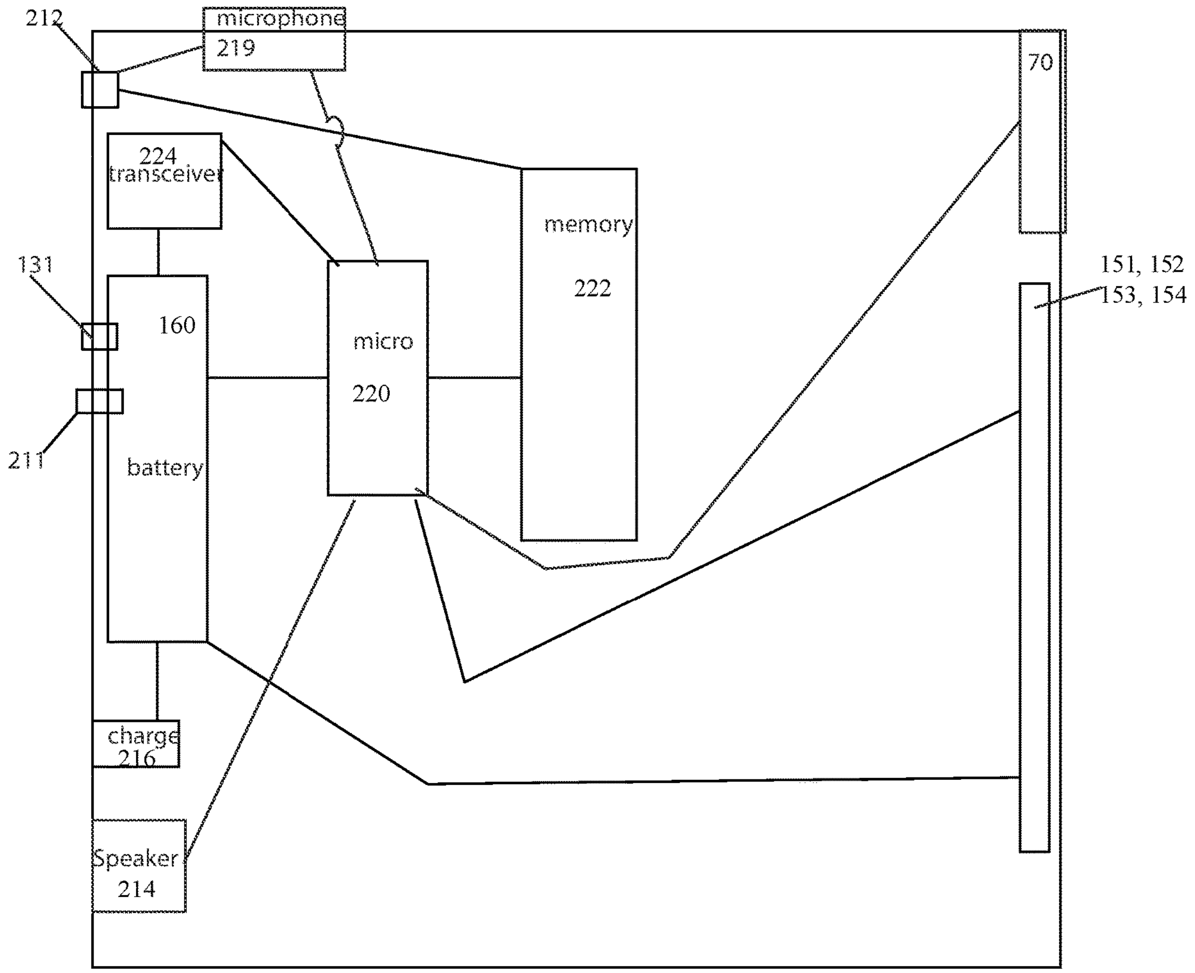
FIG. 24 is a schematic block diagram of the electronics inside of the binder.

FIG. 24 is a schematic view of the electronics of the device wherein there is an on/off button 211 in communication with battery/batteries 160. There is also a transceiver 224 which is powered by battery 160 and in communication with microprocessor or microcontroller 220. Transceiver is configured for communication with other devices such as a WIFI or Bluetooth device. Microcontroller or microprocessor 220 is in communication with battery 160 as well as with memory 222. A charge slot 216, such as a USB charge slot is fit into a bracket such as back bracket or plate section 21 or 121 (See FIGS. 6B and 18B) and is configured to receive a charge cable for charging battery 160. A speaker 214 is in communication with microcontroller 220. Speaker 214 is configured to annunciate a recording which can be stored in memory 222. A slot 212 is configured to receive a memory card which can include a particular recording that can be slid in and used to play when a page is turned. Touch sensors 151 and 152 or complementary switch connector 153 and magnetic reed 154 are shown in communication with a microcontroller 220 and configured to selectively light a light such as light or LED strip 70 when the touch sensors 151 and 152 or associated complementary switch connector 153 and magnetic reed 154 are not in contact with each other. In addition, with the contact of the touch sensors 151, 152 or the switch connector 153, and complementary magnetic reed 154 or the disconnect with the touch sensors 151, 152, or the disconnect of the switch connector 153 and magnetic reed 154, this is an indication that a pre-set audio recording should be either initiated or stopped. This audio recording is stored in memory 222 or in a memory card inserted into card slot 212. There is also shown magnetic reed 154 and switch connector 153 which can be alternatively used to switch on or off light or LED strip 70 to illuminate or power off the respective pages 30 and 40. There is also shown a charge indicator light 131 which is configured to indicate whether the batteries such as batteries 160 are charged. There is also a microphone 219 in communication with microprocessor 220 as well. Microphone 219 is configured for selectively recording a user, who can in particular record a phrase, sentence or statement associated with one or more pages and then save these recordings to a memory such as memory 222.

Figure 25:
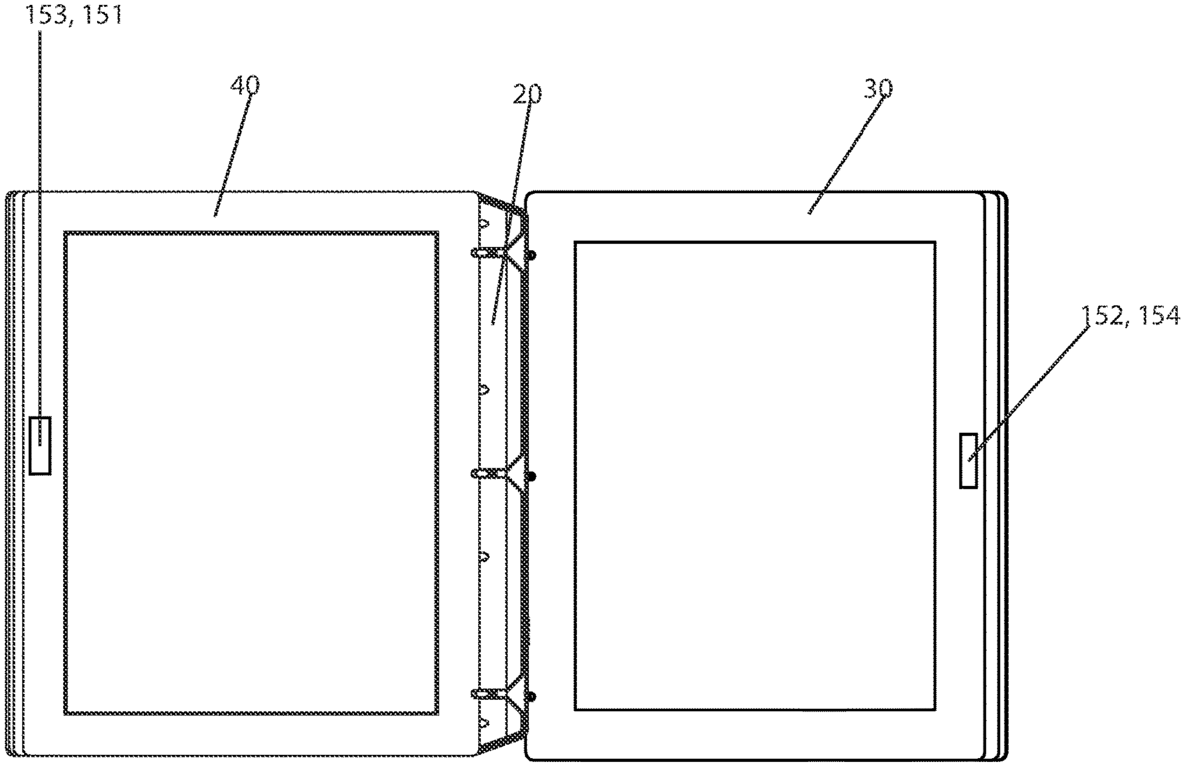
FIG. 25 is a view of the open book with the magnet reed and the placement of the magnet or a tact switch showing.

FIG. 25 is a view of an open book having pages 30 and 40 shown with magnetic reed 154 and the complementary switch connector 153 shown as well in page 40. Thus, when the pages 30 and 40 are pressed together the pages 30 and 40 are not lit up. However, when the pages 30 and 40 are separated. The magnetic reed 154 and the magnetic switch connector 153 are disconnected from each other and send a signal to microprocessor 220 (See FIG. 24) to send a signal to the respective lights to light the lights on those respective pages 30 and 40. Alternatively, when the touch sensors 151, and 152 are disconnected from each other, this sends a signal to microprocessor 220 (see FIG. 24) to turn on light 70 to illuminate the pages.

Figure 26:
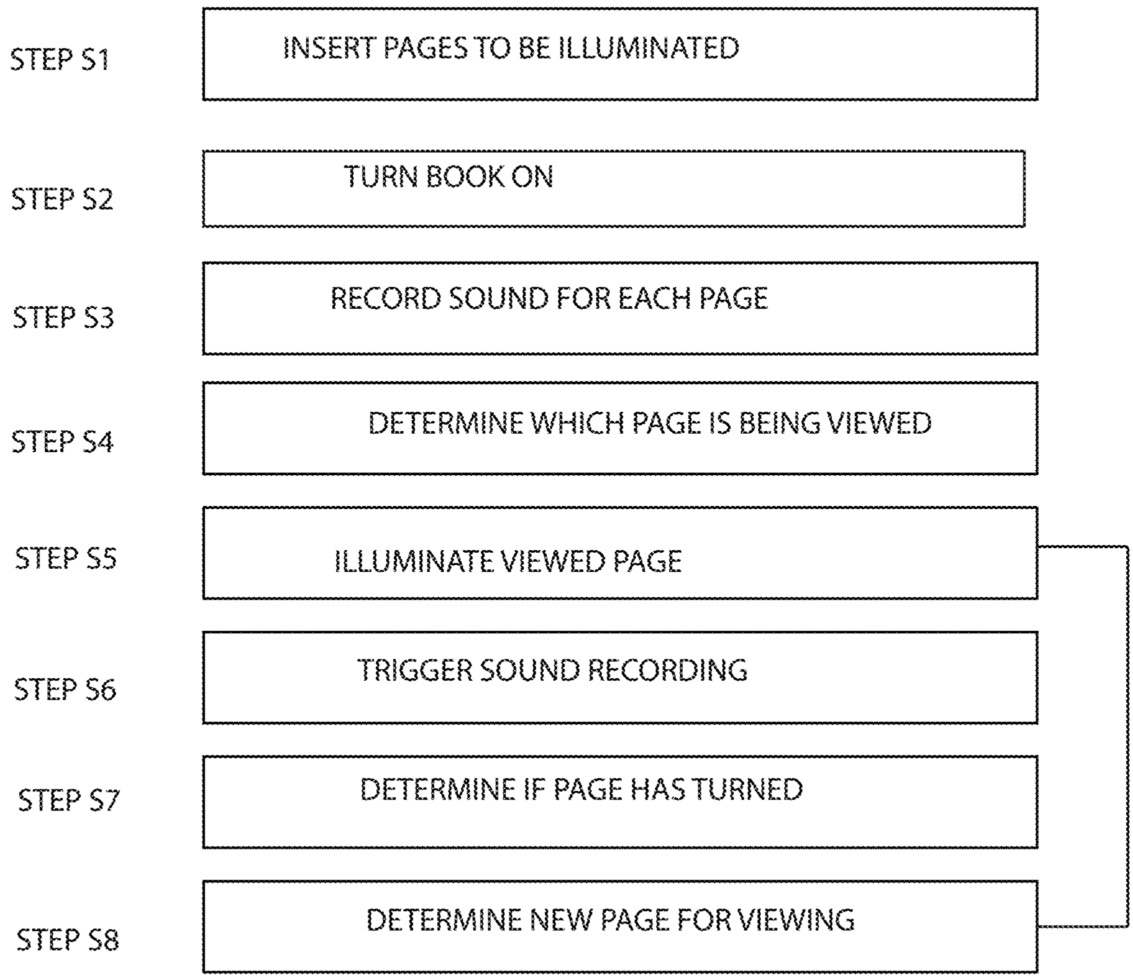
FIG. 26 is a flow chart for the process for using the book.

FIG. 26 is a flow chart for the process for using the book. For example the process starts with step S1 wherein the user can insert pages to be illuminated. This insertion is described above as inserting the artwork pages such as pages 150 and 159 between sheets 33 and 36 or between 53 and 56 in a two sheet page model. The pages of artwork 150 and 159 are inserted so that they face opposite each other so that once these pages are inside they represent the front and back of a typical book page. With this design, the pages are front lit by the acrylic or plexiglass (or otherwise translucent) pages 33 and 36 or pages 53 and 56. Alternatively if a single page model is used such as only using page 33 or 53, the pages of artwork such as pages 150 and 159 are back lit by page 33 or 53. Next in step S2, the user can turn the book on such as by using switch 211. Next, in an optional step, step S3 a user can have a pre-recorded message or record their own clips of reading the book such as via microphone 219. These clips are stored in memory 222 or stored in card 212 and then uploaded to memory 222. Each of these clips can be associated with a particular page such that microprocessor or microcontroller 220 determines which page is being viewed and/or read and then starts the recording. It determines which page is being read through contacts or magnetic reeds 151 and 152 (See step S4). Next, in step S5 once the page that is being viewed is determined, it illuminates the viewed page. Next, in step S6, the viewed page results in the triggered sound recording, via microprocessor 220 determining which page is being viewed and then sending the associated recorded clip to speaker 214. Next, in step S7 the system, particularly microprocessor 220 determines if a page has turned. Next, if a page has turned, the microprocessor 220 determines the new page for viewing in step S8. Once the new page for viewing has been determined the process returns to step S5 to illuminate a new page and or on to step S6 to trigger a new sound recording.

Thus, there is created an intelligent book design which allows a user to use artwork which can then be selectively illuminated and be accompanied by a sound recording to deliver a rich interactive experience for a reader. This design can be especially useful for children or new readers who would benefit from this type design.

Accordingly, while at least one embodiment of the present invention have been shown and described, it is to be understood that many changes and modifications may be made thereunto without departing from the spirit and scope of the invention as defined in the appended claims.

What is claimed is:

1. An electronic page illumination device comprising:

at least one binder;

at least one battery disposed inside of said at least one binder;

at least one page coupled to said at least one binder;

wherein said at least one page comprises a bracket, wherein the bracket comprises a first frame and a second frame, said first frame and said second frame being coupled together;

at least one translucent sheet, at least one light comprising an LED light strip disposed inside of the bracket, and adjacent to and on a peripheral side of said at least one translucent sheet, wherein said at least one translucent sheet is illuminated by said at least one light which is disposed inside of said bracket.

2. The device as in claim 1, further comprising at least one second translucent sheet and wherein at least one of said at least one translucent sheet and said at least one second translucent sheet is made from a plastic material.

3. The device as in claim 2, wherein said plastic material comprises any one of plexiglass or acrylic.

4. The device as in claim 2, wherein said at least one translucent sheet is spaced apart from said at least one second translucent sheet and wherein a written page is configured to be placed between said at least one translucent sheet and said at least one second translucent sheet.

5. The device as in claim 2, wherein at least one of said at least one translucent sheet and said at least one second translucent sheet are coupled to said at least one light and are configured to conduct light created by said at least one light.

6. The device as in claim 1, wherein the at least one binder comprises a slidable bracket.

7. The device as in claim 1, further comprising at least one microprocessor, wherein said at least one microprocessor is disposed inside of said at least one binder.

8. The device as in claim 1, wherein said at least one light is disposed in said bracket and encircles at least one of said at least one translucent sheet and said at least one second translucent sheet.

9. The device as in claim 1, further comprising a microphone, wherein said microphone is disposed in said at least one binder.

10. The device as in claim 1, further comprising at least one microprocessor and at least one memory wherein said at least one microprocessor and said at least one memory are disposed in said at least one binder.

11. The device as in claim 10, wherein said at least one battery is rechargeable.

12. The device as in claim 11, further comprising at least one USB port for providing power to recharge said at least one battery.

13. The device as in claim 12, further comprising at least one transceiver disposed in said at least one binder and in communication with said microprocessor, said transceiver for communicating wirelessly with other devices.

14. The device as in claim 13, further comprising at least one memory card slot disposed in said at least one binder, said memory card slot for receiving a memory card.

15. The device as in claim 14, further comprising at least one touch sensor, said at least one touch sensor being coupled to said bracket of said at least one page.

16. The device as in claim 15, wherein said at least one touch sensor is in communication with said at least one microprocessor to selectively light said at least one light.

17. The device as in claim 16, wherein said microprocessor lights said at least one light when a first touch sensor indicates that it is not in contact with an adjacent touch sensor.

18. The device as in claim 17, wherein at least one of said touch sensors is a magnetic reed.

19. A process for using a book according to claim 17, comprising the following steps:

coupling said at least one page having indicia to said at least one translucent sheet;

turning said battery on to light said at least one light;

determining which page is being viewed by determining whether any one of said touch sensors is not in contact with an adjacent complementary touch sensor;

illuminating said at least one page by turning on said at least one light disposed in a particular bracket in a particular page.

20. The process as in claim 19, further comprising the step of playing a sound recording when said microprocessor determines that said at least one touch sensor on a first page is not in communication with an adjacent touch sensor on an adjacent page.

* * * * *